United States Patent
Nam et al.

(10) Patent No.: US 11,924,739 B2
(45) Date of Patent: Mar. 5, 2024

(54) DISCOVERY OF RECONFIGURABLE SURFACES

(71) Applicant: QUALCOMM Incorporated, San Diego, CA (US)

(72) Inventors: Wooseok Nam, San Diego, CA (US); Yucheng Dai, San diego, CA (US); Tao Luo, San Diego, CA (US); Peter Gaal, San Diego, CA (US); Sony Akkarakaran, Poway, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/362,609

(22) Filed: Jun. 29, 2021

(65) Prior Publication Data

US 2022/0416933 A1     Dec. 29, 2022

(51) Int. Cl.
*H04B 7/026* (2017.01)
*H04B 7/04* (2017.01)
(Continued)

(52) U.S. Cl.
CPC .......... *H04W 40/246* (2013.01); *H04B 7/026* (2013.01); *H04B 7/04013* (2023.05);
(Continued)

(58) Field of Classification Search
CPC ....... H01Q 3/44–46; H01Q 15/14–248; H01Q 19/10–195; H04B 7/02–17; H04B 17/0082–409; H04L 1/0001–0039; H04L 5/0001–26; H04L 27/0002–389; H04L 2027/0016–0097; H04W 8/005–245; H04W 24/02–10; H04W 28/02–26; H04W 36/0005–385; H04W 40/005–38;
(Continued)

(56) References Cited

U.S. PATENT DOCUMENTS

| | | | |
|---|---|---|---|
| 2022/0322321 A1* | 10/2022 | Dai | ........................ H04W 48/16 |
| 2023/0308140 A1* | 9/2023 | Baligh | ............... H04B 7/04013 |

OTHER PUBLICATIONS

Huang K-W., et al., "Intelligent Reflecting Surface Aided Pilot Contamination Attack and Its Countermeasure", IEEE Transactions on Wireless Communications, IEEE Service Center, Piscataway, NJ, US, vol. 20, No. 1, Sep. 25, 2020, pp. 345-359, XP011831125. (Year: 2020).*

(Continued)

*Primary Examiner* — Timothy J Weidner
(74) *Attorney, Agent, or Firm* — Holland & Hart LLP

(57) ABSTRACT

Methods, systems, and devices for wireless communications are described. During an operation for discovering reconfigurable surfaces, a sensing signal may be transmitted. Based on the sensing signal being transmitted, another signal may be detected at the device that transmitted the sensing signal, another device, or both. The device that detects the signal may combine the detected signal with a modulation sequence that is associated with a reconfigurable surface, where the reconfigurable surface may be assigned a set of unique modulation sequences and configured to apply a modulation sequence to received signals. Based on combining the detected signal with the modulation sequence, the device may determine whether the reconfigurable surface is present within a geographic region.

30 Claims, 16 Drawing Sheets

(51) Int. Cl.
| | |
|---|---|
| H04B 17/30 | (2015.01) |
| H04B 17/40 | (2015.01) |
| H04L 1/00 | (2006.01) |
| H04L 27/00 | (2006.01) |
| H04W 8/00 | (2009.01) |
| H04W 8/22 | (2009.01) |
| H04W 24/08 | (2009.01) |
| H04W 24/10 | (2009.01) |
| H04W 40/24 | (2009.01) |
| H04W 48/02 | (2009.01) |
| H04W 48/16 | (2009.01) |
| H04W 64/00 | (2009.01) |
| H04W 84/00 | (2009.01) |
| H04W 84/04 | (2009.01) |
| H04W 88/02 | (2009.01) |
| H04W 88/08 | (2009.01) |
| H04W 92/02 | (2009.01) |
| H04W 92/10 | (2009.01) |
| H04W 92/20 | (2009.01) |

(52) U.S. Cl.
CPC ............ *H04B 17/30* (2015.01); *H04B 17/40* (2015.01); *H04L 1/0003* (2013.01); *H04L 1/0009* (2013.01); *H04L 27/0008* (2013.01); *H04L 27/0012* (2013.01); *H04W 8/005* (2013.01); *H04W 8/22* (2013.01); *H04W 24/08* (2013.01); *H04W 24/10* (2013.01); *H04W 40/248* (2013.01); *H04W 48/02* (2013.01); *H04W 48/16* (2013.01); *H04W 64/003* (2013.01); *H04W 64/006* (2013.01); *H04W 84/005* (2013.01); *H04W 84/047* (2013.01); *H04W 88/02* (2013.01); *H04W 88/085* (2013.01); *H04W 92/02* (2013.01); *H04W 92/10* (2013.01); *H04W 92/20* (2013.01)

(58) Field of Classification Search
CPC . H04W 48/02–20; H04W 64/003–006; H04W 72/02–569; H04W 74/002–0891; H04W 76/10–50; H04W 84/005–22; H04W 88/005–188; H04W 92/02–24
See application file for complete search history.

(56) References Cited

OTHER PUBLICATIONS

Huang K-W., et al., "Intelligent Reflecting Surface Aided Pilot Contamination Attack and Its Countermeasure", IEEE Transactions on Wireless Communications, IEEE Service Center, Piscataway, NJ, US, vol. 20, No. 1, Sep. 25, 2020, pp. 345-359, XP011831125.
International Search Report and Written Opinion—PCT/US2022/034728—ISA/EPO—dated Sep. 27, 2022.

\* cited by examiner

DISCOVERY OF RECONFIGURABLE SURFACES

FIELD OF TECHNOLOGY

The following relates to wireless communications, including discovery of reconfigurable surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support discovery of reconfigurable surfaces. During an operation for discovering reconfigurable surfaces, a sensing signal may be transmitted. Based on the sensing signal being transmitted, another signal may be detected at the device that transmitted the sensing signal, another device, or both. The device that detects the signal may combine the detected signal with a modulation sequence that is associated with a reconfigurable surface, where the reconfigurable surface may be assigned a set of unique modulation sequences and configured to apply a modulation sequence to received signals. Based on combining the detected signal with the modulation sequence, the device may determine whether the reconfigurable surface is present within a geographic region.

DETAILED DESCRIPTION

Figure 1:
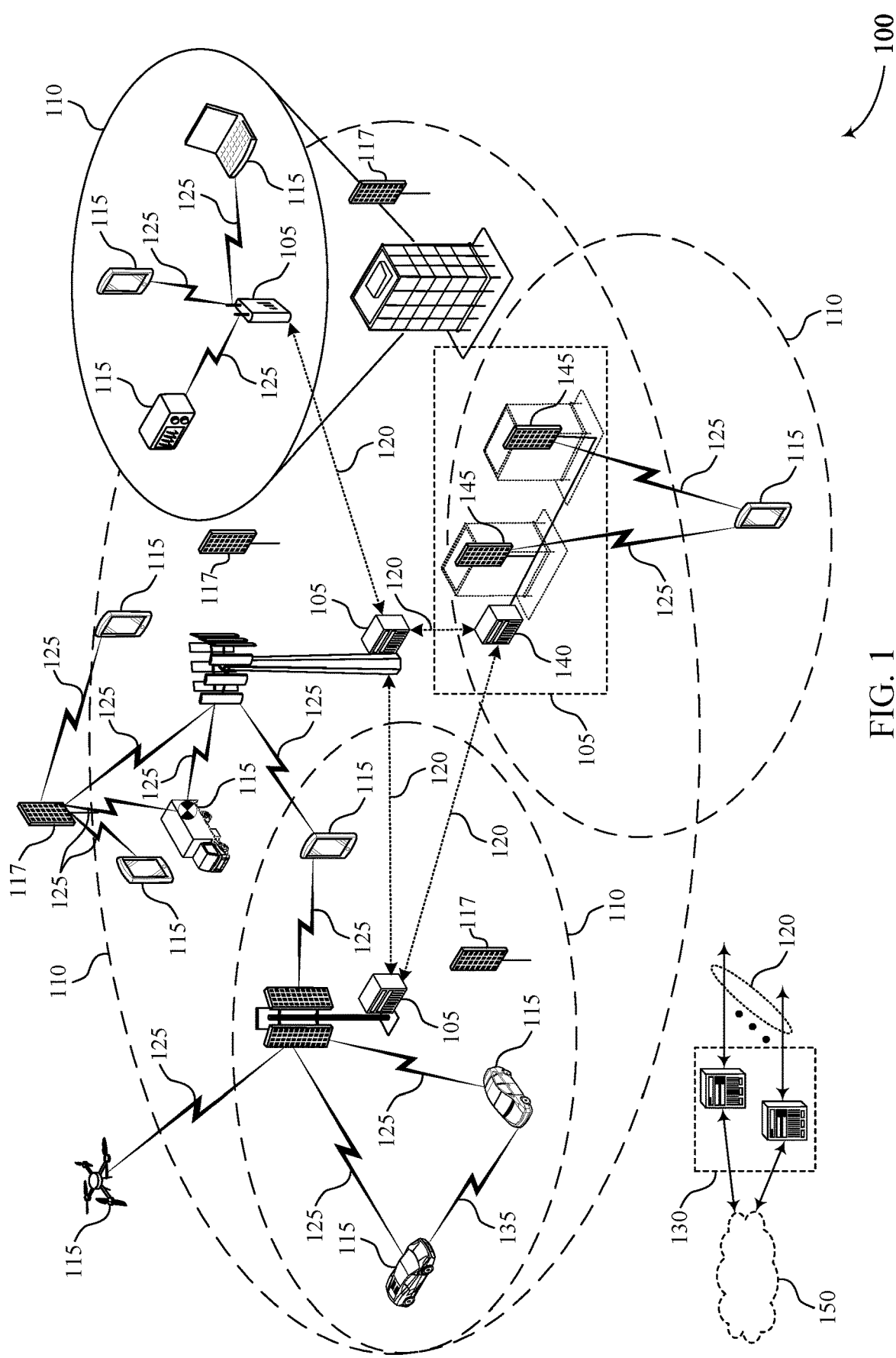
FIG. 1 illustrates an example of a wireless communications system that supports discovery of reconfigurable surfaces in accordance with aspects of the present disclosure.

In a wireless communications system, base stations may use reconfigurable surfaces to transmit signals to other devices (e.g., other base stations, consumer premises equipment, user equipment (UE), etc.) via an indirect path—e.g., if a direct path between a base station and another device is blocked. A reconfigurable surface may be a device with a configurable angle of reflection. In some examples, a base station may configure an angle of reflection for a reconfigurable surface—e.g., by transmitting a message for configuring the angle of reflection. In other examples, the angle of reflection of the reconfigurable surface (which may correspond to a reflective state of the reconfigurable surface) may change in a pattern that is known to the base station. In either case, the base station may use information known about reconfigurable surfaces to transmit to other devices using one or more reconfigurable surfaces.

As the use of peer-to-peer (e.g., sidelink) communications increases, blockages between devices (e.g., UEs) may become more significant and communications between devices may be improved by using a reconfigurable surface. However, devices that use peer-to-peer communications may not have information about a reconfigurable surface, including information used to determine a presence of a reconfigurable surface in a region, a relative position of a reconfigurable surface, a reflective state of a reconfigurable surface, or any combination thereof. Without this information, devices may be unable to use reconfigurable surfaces to support peer-to-peer communications.

To enable devices to use reconfigurable surfaces to support peer-to-peer communications, enhanced procedures for discovering and acquiring information about reconfigurable surfaces may be used. In some examples, a signal may be detected (e.g., by a base station, UE, or CPE) during an operation associated with discovering a presence of reconfigurable surfaces. Based on detecting the signal, the signal may be combined with a modulation sequence associated with a reconfigurable surface to obtain a combined signal. In some examples, combining the modulation sequence with the signal may suppress components of the signal associated with other paths between a device and an originating device of the signal (e.g., a direct path, an indirect path via another reconfigurable surface, an indirect path reflected via a blockage, etc.) and emphasize a component of the signal associated with an indirect path via the reconfigurable surface. A metric (e.g., a reference signal receive power (RSRP), a signal-to-noise ratio (SNR), a signal-to-interference-tonoise ratio (SINR), a channel impulse response (CIR), a signal peak, etc.) of the combined signal may be measured—e.g., using CIR estimation, peak detection, or both. In some examples, whether the reconfigurable surface associated with the applied modulation sequence is providing an indirect path to the device may be determined based on the measurement e.g., a presence of the reconfigurable surface in an indirect path to the device may be determined if the metric is above a threshold.

In some examples, the detected signal may include a signal component modulated by a reconfigurable surface. In such cases, a sensing signal associated with discovering a presence of the reconfigurable surface may be transmitted (e.g., by a device attempting to detect reconfigurable surfaces) and arrive at a reconfigurable surface. Based on the arrival of the sensing signal at the reconfigurable surface, a modulation sequence may be applied by the reconfigurable surface to the sensing signal to obtain a modulated signal. The modulated signal may be reflected from the reconfigurable surface based on an angle of reflection configured for the reconfigurable surface—e.g., in a direction of the device that transmitted the sensing signal or another device. The detected signal may include the modulated signal.

By using modulation sequences that are unique to reconfigurable surfaces, a device may discover the presence of a reconfigurable surface within a geographic region based on receiving a signal including a signal component modulated in accordance with a modulation sequence of the reconfigurable surface. Accordingly, a device may use discovered reconfigurable surfaces to communicate with other devices (e.g., using peer-to-peer techniques, such as sidelink).

Aspects of the disclosure are initially described in the context of wireless communications systems. Aspects of the disclosure are also described in the context of composite signal. Aspects of the disclosure are further illustrated by and described with reference to apparatus diagrams, system diagrams, and flowcharts that relate to discovery of reconfigurable surfaces.

FIG. 1 illustrates an example of a wireless communications system 100 that supports discovery of reconfigurable surfaces in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may form beams in multiple directions originating from the base station 105. In some examples, a beam may be selected for communications between a base station 105 and a UE 115. In such cases, an energy of beamformed transmissions from base station 105 using the beam may be focused in a direction of the beam.

Based on using beamformed transmissions and, in some examples, higher frequencies for wireless communications, an effect of objects positioned between a base station 105 and UE 115 (which may be referred to as blockages) on communications between the base station 105 and UE 115 may be increased. Accordingly, in some examples, an increased quantity of base station 105 may be deployed in a radio access network to ensure reliable coverage across a geographic region.

In some examples, to reduce the quantity of deployed base stations 105, reconfigurable surfaces 117 may be deployed in the radio access network instead of base stations 105. The reconfigurable surfaces 117 may be used to reflect signals received from a base station 105—e.g. toward an intended receiving device. A reconfigurable surface 117 may be composed of uniformly distributed electrically controllable elements—e.g., transmissions lines or resonators whose characteristics can be changed by varying a capacitance of the transmission lines or the resonators. Each element of a reconfigurable surface 117 may have reconfigurable electromagnetics characteristics (e.g., a reflection coefficient). Based on the combination of configured states of the elements, a reconfigurable surface 117 can reflect and modify incident radio waveforms in a controlled manner—e.g., changing reflected direction, beam width, etc. Accordingly, a reconfigurable surface 117 may be deployed in a radio access network to alter the channel realization of the radio network in a controlled manner, increasing channel diversities and providing robustness to channel blocking/fading.

In some examples, a reconfigurable surface 117 is a reconfigurable intelligent surface (RIS), a repeater (e.g., a smart repeater), or the like. An RIS may be a passive device that can be configured to have a desired angle of reflection and a repeater may be an active device that can be configured to provide a desired angle of reflection. An RIS may include passive components that change characteristics as waveforms propagate through or come into contact with the passive components (e.g., electronically controllable waveguides, electronically controllable transmission lines, adjustable reflectors, etc.). A repeater may include active components that modify received signals and retransmits the modified received signals. A reconfigurable surface 117 that uses passive components to modify received signals may use less energy than a reconfigurable surface 117 that uses active components to modify received signals. In some examples, an RIS includes an array of reflective elements (e.g., controllable transmission lines).

A base station 105 may use a reconfigurable surface 117 to transmit a signal to a UE 115 via an indirect path (e.g., if a direct path to the UE 115 is blocked). That is, based on an angle of reflection configured at the RIS and a position of a UE 115 relative to the RIS, the base station 105 may transmit a signal to the RIS such that a reflection of the signal (e.g., based on an angle of incidence of the signal) travels toward the UE 115. In some examples, the base station 105 controls an angle of reflection configured at a reconfigurable surface 117 e.g., by sending a message including a configuration for the reconfigurable surface 117. In some examples, a discrete quantity of angles of arrival may be configured for a reconfigurable surface 117, where each angle of arrival may be associated with a reflective state of the reconfigurable surface 117. In other examples, a reconfigurable surface 117 may configure different angles of arrival in accordance with a preconfigured or scheduled pattern that is, the reconfigurable surface 117 may cycle between different reflective states.

In some examples, a base station 105 is programmed with the locations of reconfigurable surfaces 117 and relative positions between the base station 105 and reconfigurable surfaces 117. The base station 105 may also be programmed with classification information for the reconfigurable surfaces 117 (e.g., the type of reconfigurable surface, an operating frequency of the reconfigurable surfaces 117, a control protocol for configuring the reconfigurable surfaces 117, a reflective state-change pattern observed by the reconfigurable surfaces 117, or any combination thereof).

In some examples, other devices (e.g., other base stations 105, CPEs, UEs 115) may not be programmed with information about reconfigurable surfaces 117 in a region. In some examples, UEs 115 may be unable to determine a location of a reconfigurable surface 117 due to mobility of the UEs 115, a lack of positioning capabilities or both. The UEs 115 may also be unable track a time-varying relative position of a reconfigurable surface 117.

As the use of peer-to-peer (e.g., sidelink) communications increases (e.g., for IoT, Industrial IOT, V2X communications, etc.), blockages between devices (e.g., UEs 115) may become more significant and communications between devices may be improved by using a reconfigurable surface.

However, devices that use peer-to-peer communications may not have information about a reconfigurable surface 117, including information used to determine a presence of a reconfigurable surface 117 in a region, a relative position of a reconfigurable surface 117, a reflective state of a reconfigurable surface 117, or any combination thereof. Without this information, devices may be unable to use reconfigurable surfaces 117 to support peer-to-peer communications.

To enable devices to use reconfigurable surfaces 117 to support peer-to-peer communications, enhanced procedures for discovering and acquiring information about reconfigurable surfaces 117 in a region may be used. In some examples, a signal may be detected (e.g., by a base station, UE, or CPE) during an operation associated with discovering a presence of reconfigurable surfaces 117. Based on detecting the signal, the signal may be combined with a modulation sequence associated with a reconfigurable surface 117 (which may also be referred to as a "watermark" of the reconfigurable surface 117) to obtain a combined signal. In some examples, combining the modulation sequence with the signal may suppress components of the signal associated with other paths between a device and an originating device of the signal (e.g., a direct path, an indirect path via another reconfigurable surface 117, an indirect path reflected via a blockage, etc.) and emphasize a component of the signal associated with an indirect path via the reconfigurable surface 117. A metric (e.g., an RSRP, an SNR, an SINR, a CIR, a signal peak, etc.) of the combined signal may be measured e.g., using CIR estimation, peak detection, or both. In some examples, whether the reconfigurable surface 117 associated with the applied modulation sequence is providing an indirect path to the device may be determined based on the measurement—e.g., a presence of the reconfigurable surface 117 in an indirect path to the device may be determined if the metric is above a threshold.

In some examples, the detected signal may include a signal component modulated by a reconfigurable surface 117. In such cases, a sensing signal associated with discovering a presence of the reconfigurable surface 117 may be transmitted (e.g., by a device attempting to detect reconfigurable surfaces 117) and arrive at a reconfigurable surface 117. Based on the sensing signal arriving at the reconfigurable surface 117, a modulation sequence may be applied by the reconfigurable surface 117 to the sensing signal to obtain a modulated signal. The modulated signal may be reflected from the reconfigurable surface 117 based on an angle of reflection configured for the reconfigurable surface 117—e.g., in a direction of the device that transmitted the sensing signal or another device. The detected signal may include the modulated signal.

Figure 2A:
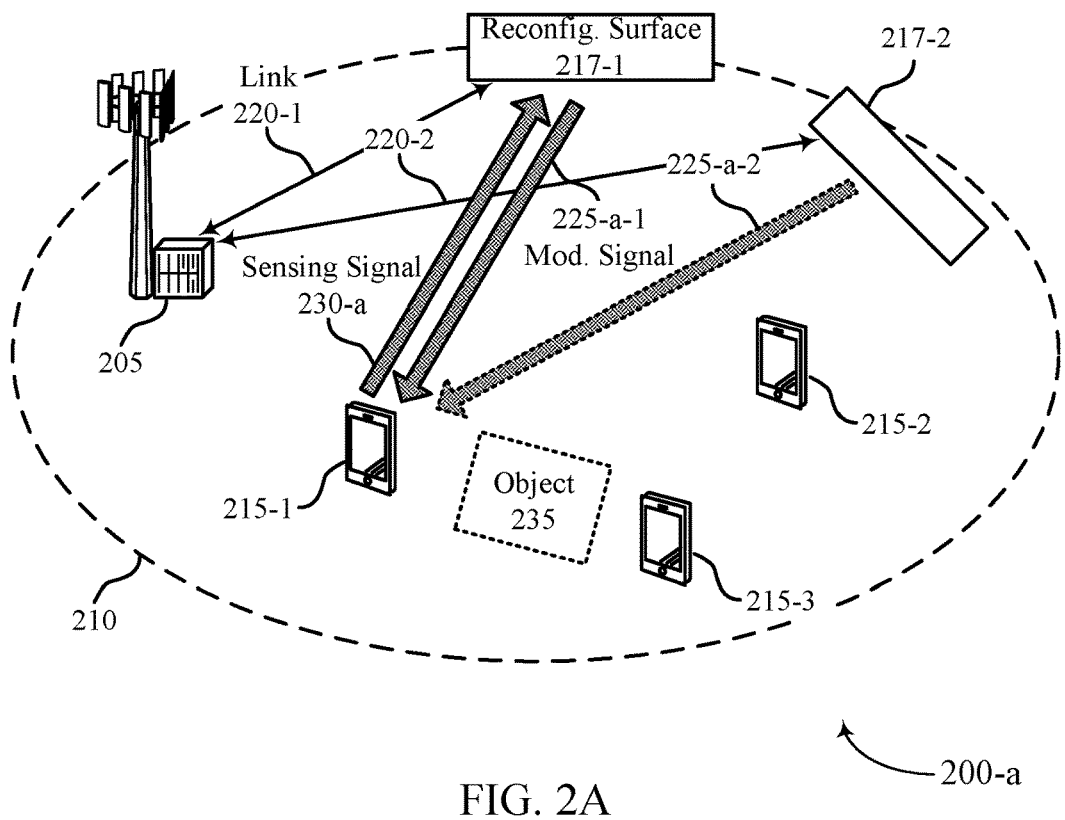
FIGS. 2A and 2B illustrate examples of a wireless communications subsystem that supports discovery of reconfigurable surfaces in accordance with aspects of the present disclosure.

FIG. 2A illustrates an example of a wireless communications subsystem that supports discovery of reconfigurable surfaces in accordance with aspects of the present disclosure.

Wireless communications subsystem 200-a includes base station 205, first UE 215-1, second UE 215-2, third UE 215-3, first reconfigurable surface 217-1, and second reconfigurable surface 217-2, which may be respective examples of a base station, UE, and reconfigurable surface described with reference to FIG. 1. Wireless communications subsystem 200-a may depict aspects of a monostatic sensing operation.

Base station 205, first UE 215-1, second UE 215-2, and third UE 215-3 may communicate with one another within coverage area 210 using one or more of the techniques described with reference to FIG. 1. For example, base station 205 may communicate with UEs 115 using one or more of first reconfigurable surface 217-1 and second reconfigurable surface 217-2. In some examples, base station 205 may have information about a position and configuration of reconfigurable surfaces in a radio access network.

Base station 205 may send messages to first reconfigurable surface 217-1 via first link 220-1 and to second reconfigurable surface 217-2 via second link 220-2. The messages may include signaling for configuring a reconfigurable surface to have a desired angle of reflection. In some examples, the signaling includes a set of reflection coefficients used to control one or more reflective elements of a reconfigurable surface or an index associated with a set of reflection coefficients.

The messages may also include control signaling, such as signaling used to assign a modulation sequence to a reconfigurable surface, signaling used to indicate a pattern for forming angles of reflections at a reconfigurable surface, and the like. In some examples, first reconfigurable surface 217-1 is assigned a first modulation sequence (or first set of modulation sequences) and second reconfigurable surface 217-2 is assigned a second modulation (or second set of modulation sequences). The first modulation sequence may be different than the second modulation sequence. Similarly, the first set of modulation sequences may be different than the second set of modulation sequences—e.g., such that no two sequences between the sets of modulation sequences are the same. In some examples, each modulation sequence in a set of modulation sequences corresponds to a respective angle of reflection (or reflective state) of the reconfigurable surface to which the set of modulation sequences is assigned. Links 220 may be wired or wireless links.

In some examples, the modulation sequences are orthogonal to one another (e.g., if phase modulation is used), where each modulation sequence may correspond to a respective column vector of an N×N DFT matrix or Hadamard matrix. In some examples, an "all-one" sequence (which may correspond to no phase modulation being applies) is not assigned to any reconfigurable surfaces.

In some examples, the modulation sequences assigned to reconfigurable surfaces are broadcast to devices (e.g., UEs, CPEs, base stations, etc.) in a radio access network. In some examples, base station 205 broadcasts a mapping between reconfigurable surfaces and modulation sequences, e.g., in a system information message. Additionally, or alternatively, reconfigurable surfaces, or a UE, may broadcast the modulation sequences assigned to reconfigurable surfaces—e.g., in sidelink broadcast information.

As described herein, a reconfigurable surface may improve a performance of peer-to-peer communications between devices (e.g., UEs). For example, after detecting a blockage (e.g., object 235) between first UE 215-1 and third UE 215-3 (e.g., in a direct path between first UE 215-1 and third UE 215-3), first UE 215-1 may desire to use a reconfigurable surface that can provide an indirect path to third UE 215-3 (e.g., an indirect path around object 235). However, unlike base station 205, for example, first UE 215-1 may not have information indicating a presence or position of nearby reconfigurable surfaces, a relative position of first UE 215-1 to nearby reconfigurable surfaces, an identity of nearby reconfigurable surfaces, a reflectivity state pattern used by the reconfigurable surfaces, a configuration of the reconfigurable surfaces, or any combination thereof.

Thus, first UE 215-1 may perform an operation associated with detecting whether any reconfigurable surfaces are in a vicinity of first UE 215-1—e.g., to detect a presence of nearby reconfigurable surfaces. To detect reconfigurable surfaces, first UE 215-1 may transmit sensing signal 230-a. In some examples, first UE 215-1 transmits sensing signal 230-a in multiple directions—e.g., first UE 215-1 may sweep sensing signal 230-a across a set of directions. Sensing signal 230-a may include a set of portions, where the set of portions may be symbols, segments, resources, slots, etc. For examples, sensing signal 230-a may include N symbols. In some examples, each symbol may be a repetition of a same symbol. In other examples, each symbol may be a different, known signal (e.g., a PRS, a sensing reference signal that supports reconfigurable surface discovery, a CSI-RS, etc.). In some examples (e.g., when monostatic sensing is used), each symbol may be a data symbol that is transmitted to another device (e.g., second UE 215-2) and, thus, known to the transmitting device (e.g., first UE 215-1).

Based on obtaining (e.g., receiving or detecting) sensing signal 230-a, first reconfigurable surface 217-1 may apply a modulation sequence to the obtained version of sensing signal 230-a. In some examples, the modulation sequence includes phase modulation, amplitude modulation (e.g., on/off keying), polarization, spatial modulation, or a combination thereof. In some examples, the modulation sequence modulates a received signal without changing an angle with which the signal is reflected (e.g., by applying a uniform amplitude shift or a uniform phase shift to a received symbol by each reflective elements). In some examples, before applying the modulation sequence, first reconfigurable surface 217-1 detects boundaries of the portions of the received version of sensing signal 230-a.

After applying the modulation sequence, first reconfigurable surface 217-1 may output (e.g., transmit or reflect) first modulated signal 225-a-1. First modulated signal 225-a-1 may also be referred to as a reflection or modulated reflection of sensing signal 230-a. A propagation direction of first modulated signal 225-a-1 may be based on an angle of incidence of sensing signal 230-a and an angle of reflection configured at first reconfigurable surface 217-1. In some examples, first reconfigurable surface 217-1 reflects first modulated signal 225-a-1 back towards first UE 215-1.

Based on transmitting sensing signal 230-a and first reconfigurable surface 217-1 modulating and reflecting sensing signal 230-a, first UE 215-1 may receive a composite signal including first modulated signal 225-a-1. In some examples, the composite signal received at first UE 215-1 may also include interference (e.g., from reflections off of object 235, other transmissions in a vicinity of first UE 215-1, etc.).

First UE 215-1 may combine the received composite signal with the modulation sequence assigned to first reconfigurable surface 217-1. To combine the composite signal with the modulation sequence, first UE 215-1 may correlate the received composite signal with the modulation sequence assigned to first reconfigurable surface 217-1. Based on combining the received composite signal with the modulation sequence, a component of the composite signal corresponding to first modulated signal 225-a-1 may be emphasized—e.g., by suppressing the other components of the composite signal, such as components of the composite signal corresponding to reflections from object 235 (which may be referred to as "clutter") or interference from other transmissions.

Based on combining the composite signal with the modulation sequence assigned to first reconfigurable surface 217-1, first UE 215-1 may obtain a combined signal and determine metrics of the combined signal. In some examples, first UE 215-1 determines metrics of the combined signal, such as RSRP, SINR, SNR. In some examples, first UE 215-1 determines metrics of the combined signal using CIR estimation techniques, peak detection techniques, or both.

In some examples, if one or more metrics of the combined signal meet or exceed a threshold, first UE 215-1 may determine a presence of first reconfigurable surface 217-1. In other examples, if one or more (or all) of the metrics are below the threshold, first UE 215-1 may determine that first reconfigurable surface 217-1 is not in a vicinity of first UE 215-1. In some examples, when a same symbol is retransmitted in sensing signal 230-*a*, first UE 215-1 may combine the composite signal with the modulation sequence assigned to first reconfigurable surface 217-1 before performing per-symbol CIR estimation to the combined signal. When different symbols are transmitted in sensing signal 230-*a*, first UE 215-1 may perform per-symbol CIR estimation before combining the composite signal with the modulation sequence assigned to first reconfigurable surface 217-1.

First UE 215-1 may also combine the received composite signal with modulation sequences assigned to other reconfigurable surfaces (excluding second reconfigurable surface 217-2 in this example). In such examples, first UE 215-1 may determine that the other reconfigurable surfaces are not in a vicinity of first UE 215-1 based on metrics for corresponding combined signals failing to satisfy the threshold—e.g., because no modulated signals may be received from the other reconfigurable surfaces. Techniques that involve a single UE (e.g., first UE 215-1) transmitting a sensing signal (sensing signal 230-*a*) and receiving and processing reflections of the sensing signal to determine a location of nearby objects (e.g., first reconfigurable surface 217-1) may be referred to as monostatic sensing techniques.

In some examples described herein, a presence of multiple reconfigurable surfaces may be determined based on a received composite signal.

For example, second reconfigurable surface 217-2 may also obtain a version of sensing signal 230-*a* (e.g., a lower energy version than first reconfigurable surface 217-1). Second reconfigurable surface 217-2 may apply a modulation sequence to the obtained version of sensing signal 230-*a*, as similarly described with reference to first reconfigurable surface 217-1. The modulation sequence applied by second reconfigurable surface 217-2 may be different than the modulation sequence applied by first reconfigurable surface 217-1. In some examples, modulation sequence applied by second reconfigurable surface 217-2 is orthogonal to the modulation sequence applied by first reconfigurable surface 217-1—e.g., if phase modulation is used.

After applying the modulation sequence, second reconfigurable surface 217-2 may output (e.g., transmit or reflect) second modulated signal 225-*a*-2, as similarly described with reference to first reconfigurable surface 217-1. A propagation direction of second modulated signal 225-*a*-2 may be based on an angle of incidence of sensing signal 230-*a* at second reconfigurable surface 217-2 and an angle of reflection configured at second reconfigurable surface 217-2. In some examples, second reconfigurable surface 217-2 reflects second modulated signal 225-*a*-2 back towards first UE 215-1.

Based on transmitting sensing signal 230-*a* and second reconfigurable surface 217-2 also modulating and reflecting sensing signal 230-*a*, first UE 215-1 may receive a composite signal including first modulated signal 225-*a*-1 and second modulated signal 225-*a*-2, in addition to interference from other transmissions and reflections from object 235. As similarly described above, first UE 215-1 may combine the received composite signal with the modulation sequence assigned to first reconfigurable surface 217-1. Based on combining the received composite signal with the modulation sequence, a component of the composite signal corresponding to first modulated signal 225-*a*-1 may be emphasized—e.g., by suppressing or canceling a component of the composite signal corresponding to second modulated signal 225-*a*-2 and suppressing the other components of the composite signal. Based on combining the composite signal with the modulation sequence assigned to first reconfigurable surface 217-1, first UE 215-1 may determine a presence of first reconfigurable surface 217-1, as similarly described above.

First UE 215-1 may also combine the received composite signal with the modulation sequence assigned to second reconfigurable surface 217-2. Based on combining the received composite signal with the modulation sequence, a component of the composite signal corresponding to second modulated signal 225-*a*-2 may be emphasized—e.g., by suppressing or canceling a component of the composite signal corresponding to first modulated signal 225-*a*-1 and suppressing the other components of the composite signal. Based on combining the composite signal with the modulation sequence assigned to second reconfigurable surface 217-2, first UE 215-1 may determine a presence of second reconfigurable surface 217-2, as similarly described above.

After determining a presence of first reconfigurable surface 217-1, second reconfigurable surface 217-2, or both, first UE 215-1 may use one or both of first reconfigurable surface 217-1 or second reconfigurable surface 217-2 to communicate with third UE 215-3. In some examples, based on determining the presence of first reconfigurable surface 217-1, first UE 215-1 sends a message to first reconfigurable surface 217-1 that is used to configure an angle of reflection for first reconfigurable surface 217-1 that support communications to third UE 215-3.

In some examples described herein, a presence of one or more reconfigurable surfaces and reflective states of the one or more reconfigurable surfaces may be determined based on a received composite signal.

For example, first reconfigurable surface 217-1 and second reconfigurable surface 217-2 may each be assigned respective sets of modulation sequences, where each modulation sequence may be associated with different reflective states (which correspond to different angles of reflection. In some examples, the initial modulation sequence in a set of modulation sequences may correspond to an initial angle of reflection (e.g., 15 degrees), the next modulation sequence may correspond to a next angle of reflection (e.g., 30 degrees), a following modulation sequence may correspond to a following angle of reflection (e.g., 45 degrees), and so on. In such examples, first reconfigurable surface 217-1 may apply a modulation sequence to the received version of sensing signal 230-*a* that is both unique to first reconfigurable surface 217-1 and indicative of a reflective state configured at first reconfigurable surface 217-1 before transmitting first modulated signal 225-*a*-1. Second reconfigurable surface 217-2 may also apply a modulation sequence to the received version of sensing signal 230-*a* that is both unique to second reconfigurable surface 217-2 and indicative of a reflective state configured at second reconfigurable surface 217-2 before transmitting second modulated signal 225-*a*-2.

As similarly described above, first UE 215-1 may combine the composite signal received at first UE 215-1 with the first set of modulation sequences assigned to first reconfigurable surface 217-1 and determine metrics of the resulting combined signals with a threshold. Based on the combining, first UE 215-1 may determine both a presence of first reconfigurable surface 217-1 and angle of reflection configured at first reconfigurable surface 217-1. First UE 215-1 may use the determined angle of reflection to determine a position of first reconfigurable surface 217-1 relative to first UE 215-1—e.g., based on knowing the angle at which sensing signal 230-*a* was transmitted, the angle of reflection of first reconfigurable surface 217-1, and, in some examples, an angle of arrival of first modulated signal 225-*a*-1. First UE 215-1 may similar combine the composite signal received at first UE 215-1 to determine a presence of second reconfigurable surface 217-2, an angle of reflection configured at second reconfigurable surface 217-2, and a position of second reconfigurable surface 217-2 relative to first UE 215-1.

Figure 2B:
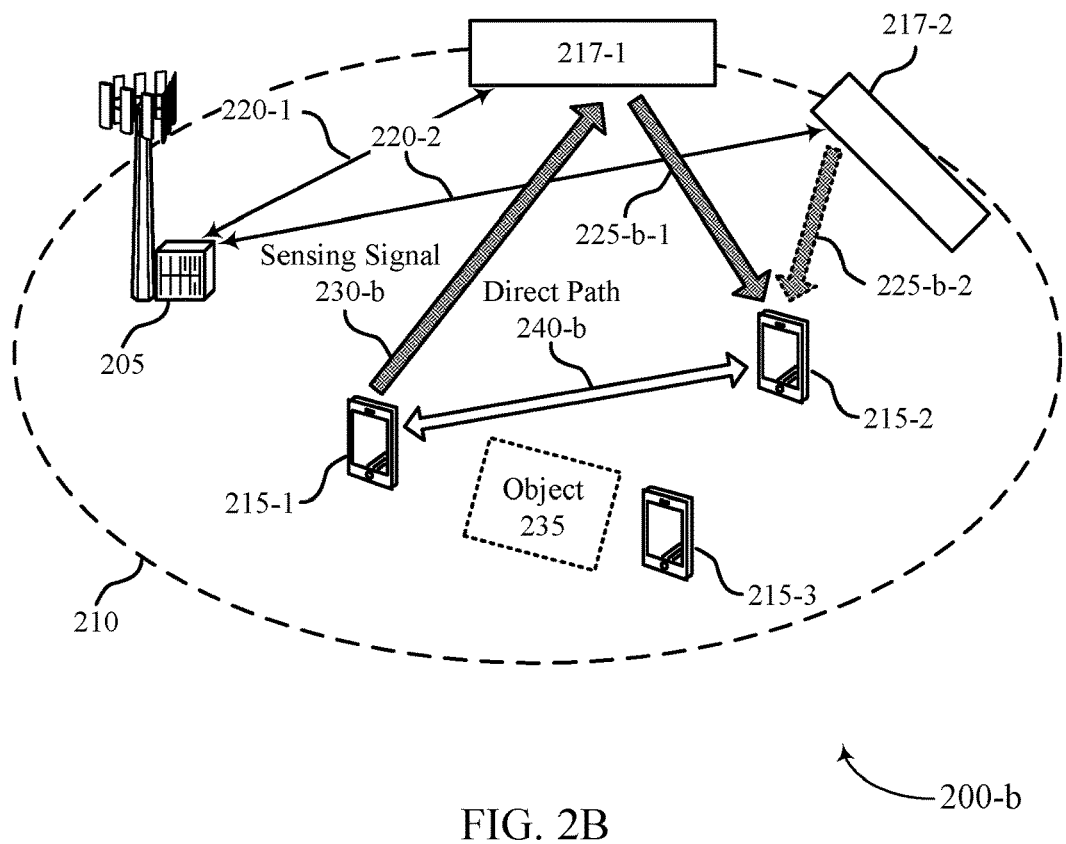

FIG. 2B illustrates an example of a wireless communications subsystem that supports discovery of reconfigurable surfaces in accordance with aspects of the present disclosure.

Wireless communications subsystem 200-*b* includes base station 205, first link 220-1, second link 220-2, first UE 215-1, second UE 215-2, third UE 215-3, first reconfigurable surface 217-1, second reconfigurable surface 217-2, and object 235, which may perform aspects of the operations described with reference to FIG. 2A. Wireless communications subsystem 200-*b* may depict aspects of a bistatic sensing operation.

First UE 215-1 may transmit sensing signal 230-*b*, as similarly described with reference to FIG. 2A. In some examples, first reconfigurable surface 217-1 may output first modulated signal 225-*b*-1, as similarly described with to FIG. 2A. However, first modulated signal 225-*b*-1 may propagate in a direction of second UE 215-2, where direct path 240-*b* may connect first UE 215-1 and second UE 215-2. In some examples, first UE 215-1 and second UE 215-2 may communicate with one another via direct path 240-*b*.

Second UE 215-2 may receive a composite signal that includes first modulated signal 225-*b*-1. In some examples, second UE 215-2 may combine the composite signal with a modulated sequence assigned to first reconfigurable surface 217-1 to obtain a combined signal, as similarly described with reference to first UE 215-1 in FIG. 2A. As similarly described with reference to first UE 215-1 in FIG. 2A, second UE 215-2 may also determine metrics of the combined signal.

In some examples, second UE 215-2 may determine a presence (and, in some examples, reflective state) of first reconfigurable surface 217-1 based on comparing the metrics of the combined signal with a threshold, as similarly described with reference to FIG. 2A. Second UE 215-2 may report the presence (and, in some examples, reflective state) of first reconfigurable surface 217-1 first UE 215-1 via direct path 240-*b*. In other examples, instead of determining the presence (and, in some examples, reflective state) of first reconfigurable surface 217-1, second UE 215-2 may transmit the metrics of the combined signal to first UE 215-1. Based on receiving the metrics, first UE 215-1 may use the reported metrics to determine the presence (and, in some examples, reflective state) of first reconfigurable surface 217-1, as similarly described with reference to FIG. 2A.

In some examples, the composite signal may also include second modulated signal 225-*b*-2. Second UE 215-2 may similarly combine the composite signal with a modulated sequence assigned to second reconfigurable surface 217-2 and determine metrics of the resulting combined signal. Second UE 215-2 may determine the presence (and, in some examples, reflective state) of second reconfigurable surface 217-2 based on the metrics and report the presence (and, in some examples, reflective state) of second reconfigurable surface 217-2 to first UE 215-1 via direct path 240-*b*. Or second UE 215-2 may report the metrics to first UE 215-1 via direct path 240-*b*, and first UE 215-1 may use the reported metrics to determine the presence (and, in some examples, reflective state) of first reconfigurable surface 217-1.

Figure 3:
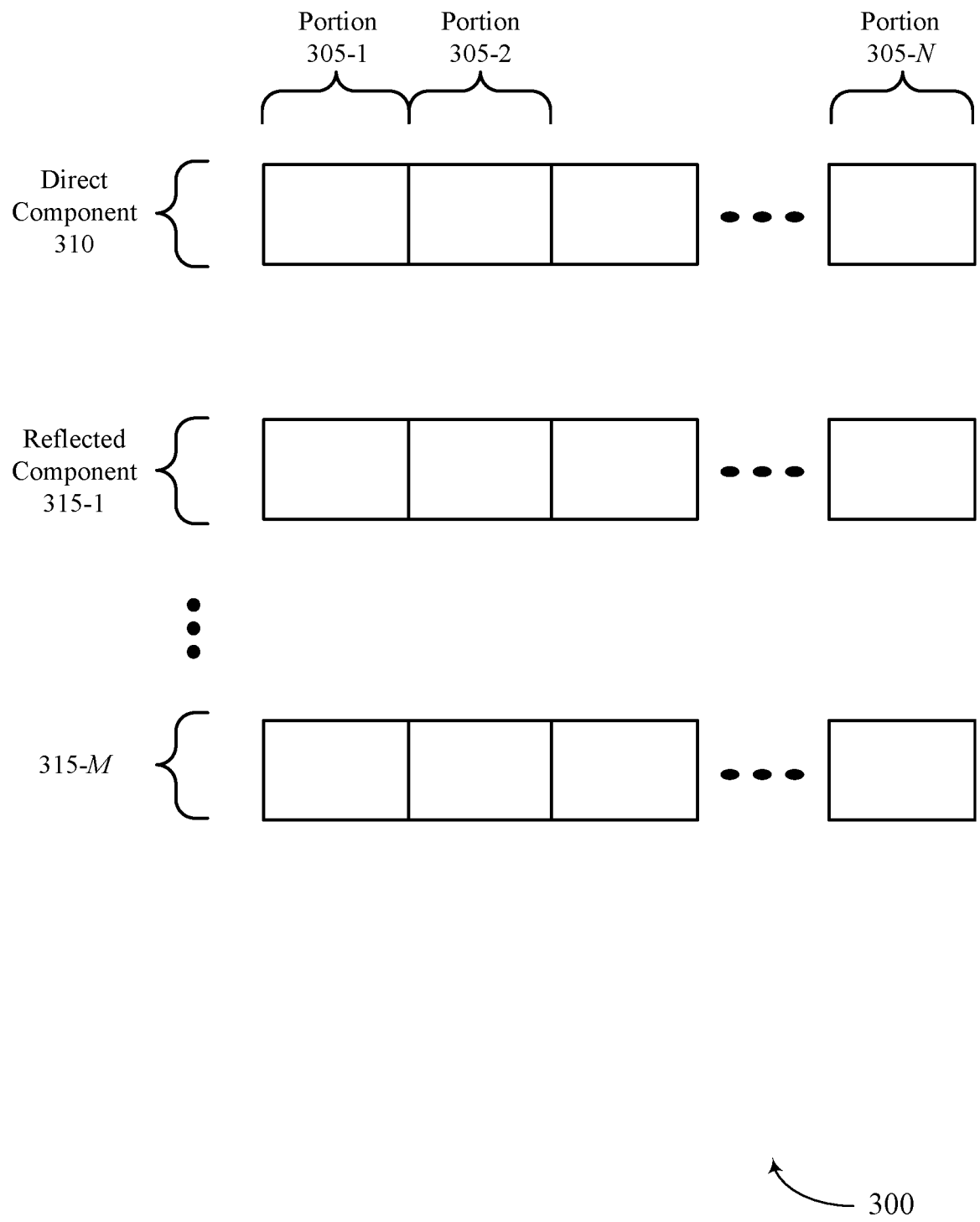
FIG. 3 illustrates an example of a composite signal associated with the discovery of reconfigurable surfaces in accordance with aspects of the present disclosure.

FIG. 3 illustrates an example of a composite signal associated with the discovery of reconfigurable surfaces in accordance with aspects of the present disclosure.

Composite signal 300 depicts an example of a composite signal received at a device, such as first UE 215-1 or second UE 215-2 of FIGS. 2A and 2B. Composite signal may include multiple portions 305 (which may also be referred to as segments). In some examples, the portions 305 correspond to a symbol period, a slot, or a communication resource (e.g., a resource block). Composite signal 300 may include N portions (e.g., N may equal four), where the quantity of portions 305 may be based on a quantity of reconfigurable surfaces in a geographic region—e.g., the quantity of portions 305 may be equal to or greater than the quantity of reconfigurable surfaces.

Composite signal 300 may include direct component 310 and one or more reflected components (e.g., one or more of first reflected component 315-1 through Mth reflected component 315-M). In some examples, M may equal two. In some examples, when monostatic sensing is used, direct component 310 may be omitted or may correspond to a reflection from an object in a vicinity of the UE that transmits the sensing signal. In some examples, composite signal 300 additionally includes components associated with interference from other transmissions or reflections of nearby objects.

Direct component 310 may correspond to a signal received via a direct path between the UE that transmits the sensing signal (e.g., first UE 215-1 of FIG. 2A or 2B) and the UE that receives composite signal 300 (e.g., second UE 215-2 of FIG. 2A or 2B). In some examples, other than or additionally to the direct path, direct component 310 may correspond to reflections of the sensing signal off of objects between the UE that transmitted the sensing signal and the UE that receives composite signal 300. In some examples, a modulation of direct component 310 may be the same as the modulation used by the transmitting UE to transmit the sensing signal.

First reflected component 315-1 may correspond to a modulated signal received from a first reconfigurable surface (e.g., first reconfigurable surface 217-1 of FIG. 2A or 2B). In some examples, a modulation of first reflected component 315-1 may be based on a modulation sequence assigned to the first reconfigurable surface, as similarly described with reference to FIG. 2A or 2B. In some examples, the modulation of first reflected component 315-1 is orthogonal to the modulation of direct component 310.

Mth reflected component 315-M may correspond to a modulated signal received from an Mth reconfigurable surface (e.g., second reconfigurable surface 217-2 of FIG. 2A or 2B). In some examples, a modulation of Mth reflected component 315-M may be based on a modulation sequence assigned to the Mth reconfigurable surface, as similarly described with reference to FIG. 2A or 2B. In some examples, the modulation of Mth reflected component 315-M is orthogonal to the modulation of direct component 310 and the modulation of first reflected component 315-1.

In some examples, the modulation applied to the symbols of the different components is a phase modulation, an amplitude modulation (e.g., on/off keying), polarization, or spatial modulation. On/off keying at a reconfigurable surface may include switching between a configuration that reflects a received signal in a focused direction and a configuration that disperses a received signal across many directions.

In some examples, N is equal to four and direct component 310 is modulated (e.g., phase modulated) based on the sequence (+, +, +, +), first reflected component 315-1 is modulated based on the sequence (+, +, −), and Mth reflected component is modulated based on the sequence (+, +, −). In some examples, the sequence (+, +, +, +) may be associated with no phase modulation being applied to the signal.

Figure 4:
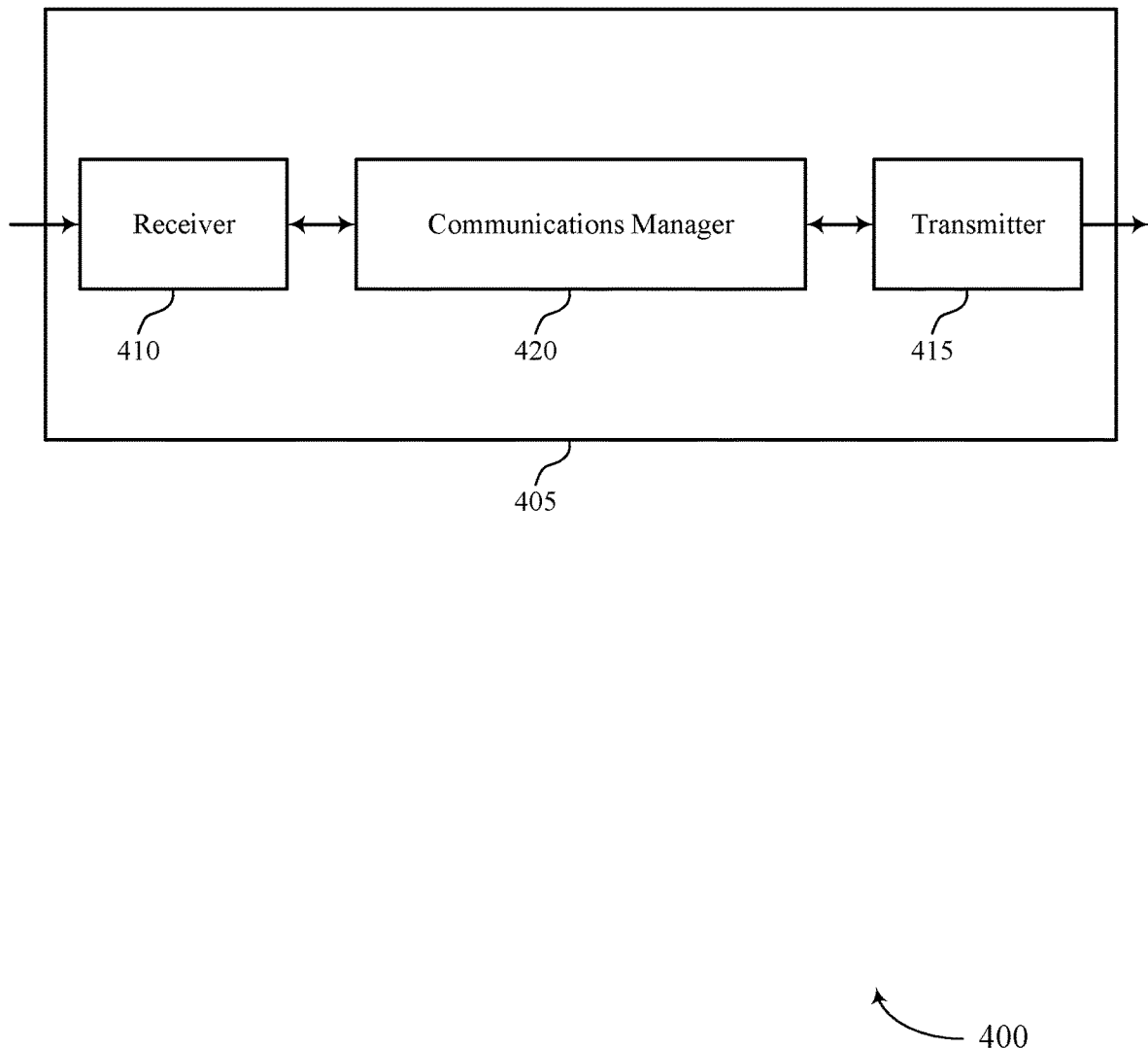
FIGS. 4 and 5 show block diagrams of devices that support discovery of reconfigurable surfaces in accordance with aspects of the present disclosure.

FIG. 4 shows a block diagram 400 of a device 405 that supports discovery of reconfigurable surfaces in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to discovery of reconfigurable surfaces). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to discovery of reconfigurable surfaces). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of discovery of reconfigurable surfaces as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a device in accordance with examples as disclosed herein. For example, the communications manager 420 may be configured as or otherwise support a means for detecting a signal during an operation associated with discovering a presence of reconfigurable surfaces. The communications manager 420 may be configured as or otherwise support a means for combining the signal with a modulation sequence to obtain a combined signal, the modulation sequence being associated with a reconfigurable surface. The communications manager 420 may be configured as or otherwise support a means for measuring a metric of the combined signal, where a presence of the reconfigurable surface in a geographic region is determined based on the metric.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for discovering reconfigurable surfaces, enabling devices to discover and use reconfigurable surfaces to improve sidelink communications between devices (e.g., UEs, CPEs, etc.).

Figure 5:
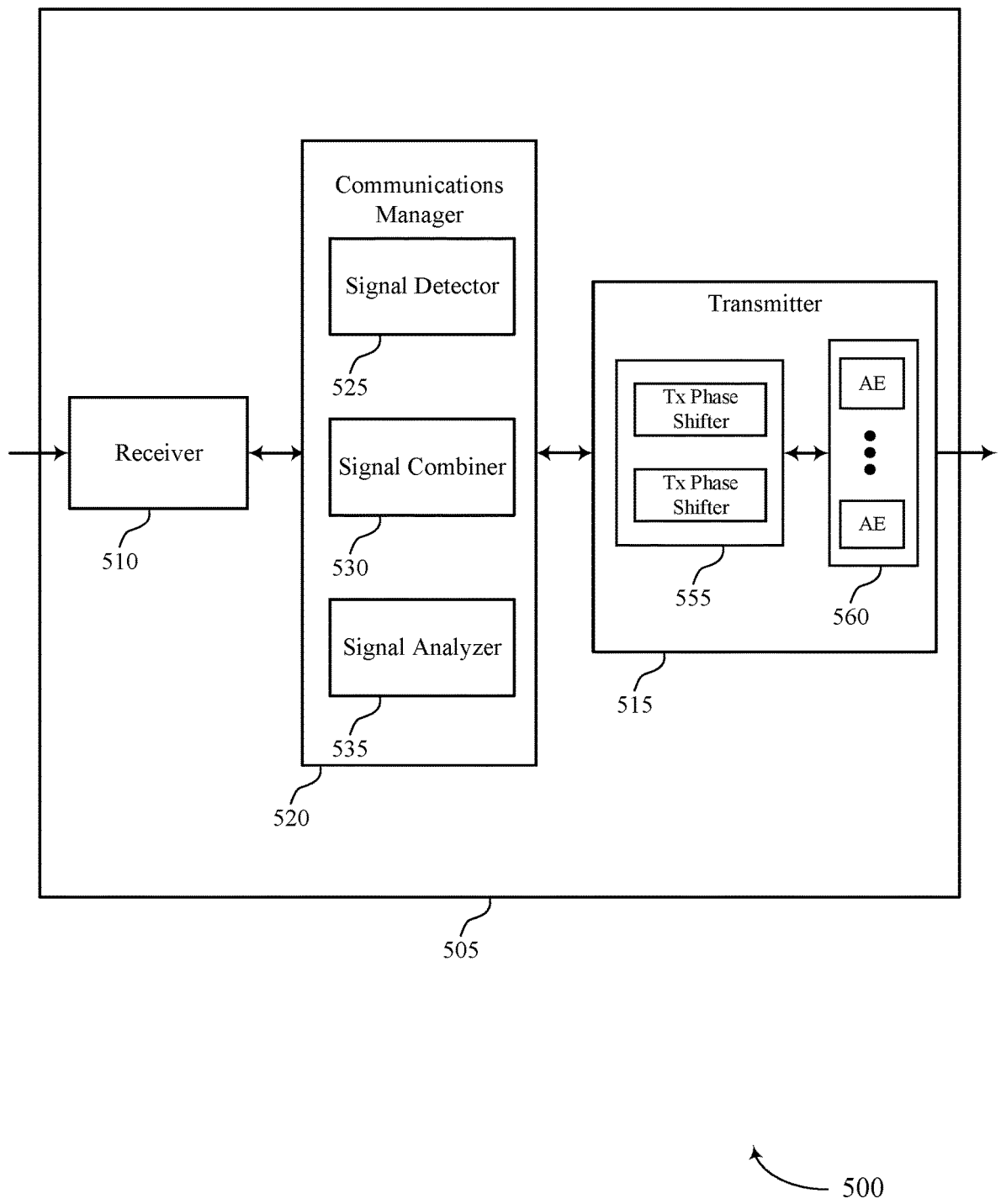

FIG. 5 shows a block diagram 500 of a device 505 that supports discovery of reconfigurable surfaces in accordance with aspects of the present disclosure. The device 505 may be an example of aspects of a device 405, a UE 115, a CPE, or base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to discovery of reconfigurable surfaces). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to discovery of reconfigurable surfaces). In some examples, the transmitter 515 may be co-located with a receiver 510 in a transceiver module. The transmitter 515 may include one or more phase shifters 555 and one or more antenna elements 560. The transmitter 515 may utilize a single antenna or a set of multiple antennas.

A phase shifter 555 may provide a configurable phase shift or phase offset to a corresponding radio frequency signal to be transmitted on a respective antenna element 560. The settings of each of the phase shifters 555 may be independent, meaning that each can be set to provide a desired amount of phase shift or the same amount of phase shift or some other configuration. A modem or other processor may have at least one control line connected to each of the phase shifters 555 and which may be used to configure the phase shifters 555 to provide a desired amounts of phase shift or phase offset between antenna elements 560.

In at least one embodiment, changing or receiving a transmit or receive beam comprises adjusting relative phase shifts for signals on different antenna elements 560. The relative phase shifts may be achieved by the modem adjusting the phase shift of the one or more phase shifters 555. The set of phases for different phase shifters 555 (and corresponding antenna elements 560) may comprise the spatial receive parameters or spatial transmit parameters for a respective beam. To receive or transmit on a beam, the spatial parameters may need to be set before the beginning of the transmitting or receiving.

The device 505, or various components thereof, may be an example of means for performing various aspects of discovery of reconfigurable surfaces as described herein. For example, the communications manager 520 may include a signal detector 525, a signal combiner 530, a signal analyzer 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a device in accordance with examples as disclosed herein. The signal detector 525 may be configured as or otherwise support a means for detecting a signal during an operation associated with discovering a presence of reconfigurable surfaces. The signal combiner 530 may be configured as or otherwise support a means for combining the signal with a modulation sequence to obtain a combined signal, the modulation sequence being associated with a reconfigurable surface. The signal analyzer 535 may be configured as or otherwise support a means for measuring a metric of the combined signal, where a presence of the reconfigurable surface in a geographic region is determined based on the metric.

Figure 6:
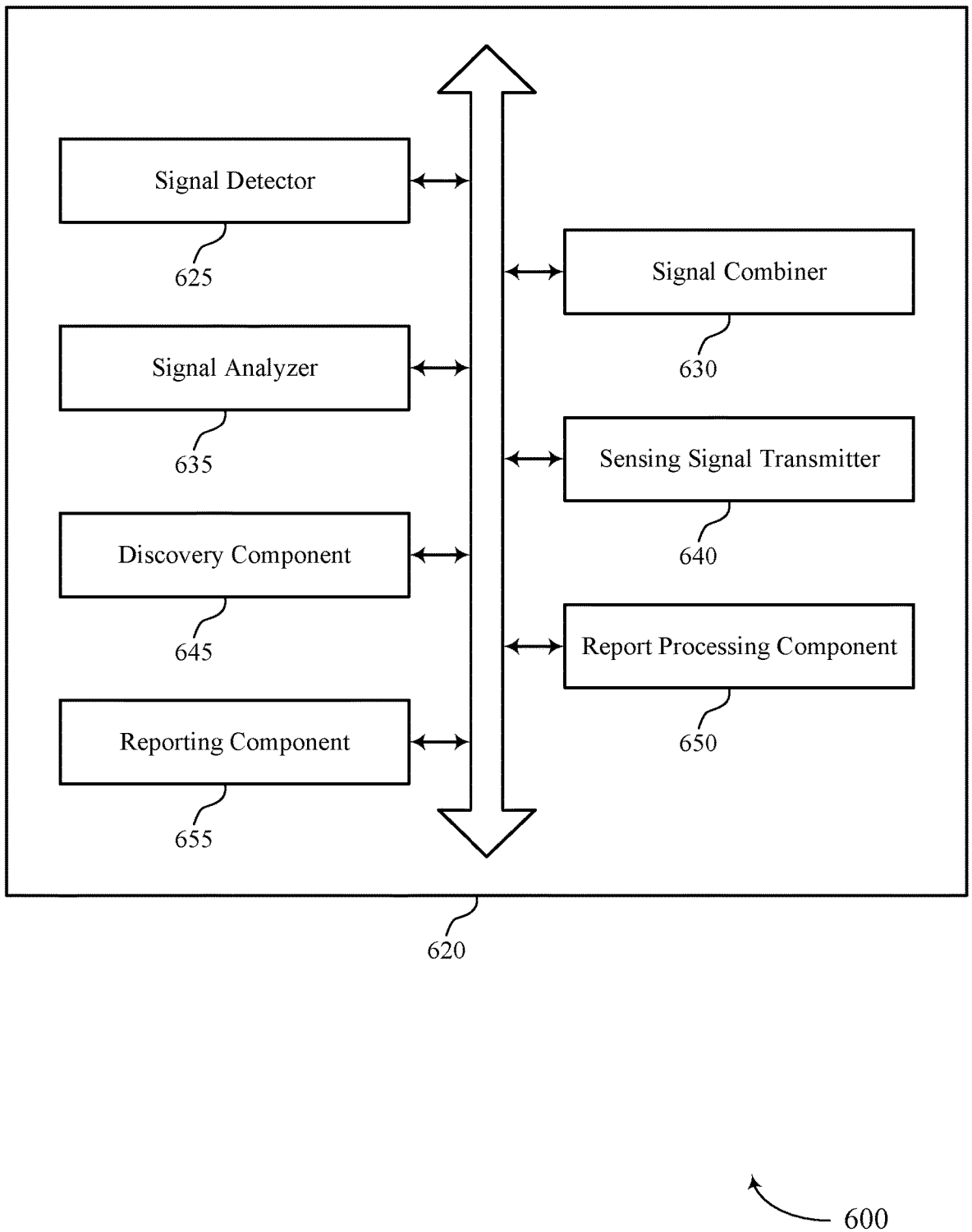
FIG. 6 shows a block diagram of a communications manager that supports discovery of reconfigurable surfaces in accordance with aspects of the present disclosure.

FIG. 6 shows a block diagram 600 of a communications manager 620 that supports discovery of reconfigurable surfaces in accordance with aspects of the present disclosure. The communications manager 620 may be an example of aspects of a communications manager 420, a communications manager 520, or both, as described herein. The communications manager 620, or various components thereof, may be an example of means for performing various aspects of discovery of reconfigurable surfaces as described herein. For example, the communications manager 620 may include a signal detector 625, a signal combiner 630, a signal analyzer 635, a sensing signal transmitter 640, a discovery component 645, a report processing component 650, a reporting component 655, or any combination thereof. Each of these components may communicate, directly or indirectly, with one another (e.g., via one or more buses).

The communications manager 620 may support wireless communication at a device in accordance with examples as disclosed herein. The signal detector 625 may be configured as or otherwise support a means for detecting a signal during an operation associated with discovering a presence of reconfigurable surfaces. The signal combiner 630 may be configured as or otherwise support a means for combining the signal with a modulation sequence to obtain a combined signal, the modulation sequence being associated with a reconfigurable surface. The signal analyzer 635 may be configured as or otherwise support a means for measuring a metric of the combined signal, where a presence of the reconfigurable surface in a geographic region is determined based on the metric.

In some examples, the sensing signal transmitter 640 may be configured as or otherwise support a means for transmitting a second signal during the operation associated with discovering the presence of reconfigurable surfaces, where the signal is a reflection of the second signal.

In some examples, the discovery component 645 may be configured as or otherwise support a means for determining, based on the metric of the combined signal exceeding a threshold, that the reconfigurable surface is present within the geographic region.

In some examples, the report processing component 650 may be configured as or otherwise support a means for receiving, from a second device, the metric of the combined signal. In some examples, the discovery component 645 may be configured as or otherwise support a means for determining, based on the metric of the combined signal exceeding a threshold, that the reconfigurable surface is present within the geographic region.

In some examples, the discovery component 645 may be configured as or otherwise support a means for transmitting, to a second device, an indication of a duration for performing the operation associated with discovering the presence of reconfigurable surfaces.

In some examples, the reporting component 655 may be configured as or otherwise support a means for transmitting, to a second device, the metric of the combined signal.

In some examples, the signal detector 625 may be configured as or otherwise support a means for detecting, during the operation associated with discovering the presence of reconfigurable surfaces, a second signal that is detected via a direct path with a second device and interferes with the signal detected during the operation, where combining the signal with the modulation sequence reduces an interference from the second signal on the signal.

In some examples, the signal combiner 630 may be configured as or otherwise support a means for combining the signal with a second modulation sequence to obtain a second combined signal, the second modulation sequence being associated with a second reconfigurable surface. In some examples, the signal analyzer 635 may be configured as or otherwise support a means for measuring a metric of the second combined signal, where a presence of the second reconfigurable surface in the geographic region is determined based on the metric of the second combined signal.

In some examples, the discovery component 645 may be configured as or otherwise support a means for receiving, in a broadcast message, a mapping between a set of multiple modulation sequences and a set of multiple reconfigurable surfaces, the set of multiple modulation sequences including the modulation sequence and the set of multiple reconfigurable surfaces including the reconfigurable surface.

In some examples, the discovery component 645 may be configured as or otherwise support a means for determining a correspondence between the signal and the reconfigurable surface based on the mapping between the set of multiple modulation sequences and the set of multiple reconfigurable surfaces.

In some examples, the discovery component 645 may be configured as or otherwise support a means for determining a correspondence between the signal, the reconfigurable surface, and an angle of reflection configured at the reconfigurable surface based on the mapping between the set of multiple modulation sequences and the set of multiple reconfigurable surfaces.

In some examples, the signal includes a set of multiple portions. In some examples, a quantity of portions of the set of multiple portions is based on a quantity of reconfigurable surfaces in the geographic region. In some examples, the set of multiple portions includes a set of multiple repetitions of a symbol or a set of multiple symbols used to represent data for a second device. In some examples, the set of multiple portions includes a set of multiple symbols, a set of multiple slots, or a set of multiple resources. In some examples, the set of multiple portions includes a set of multiple symbols, the set of multiple symbols including a reference signal associated with discovering reconfigurable surfaces, a phase reference signal, or a channel state information reference signal.

Figure 7:
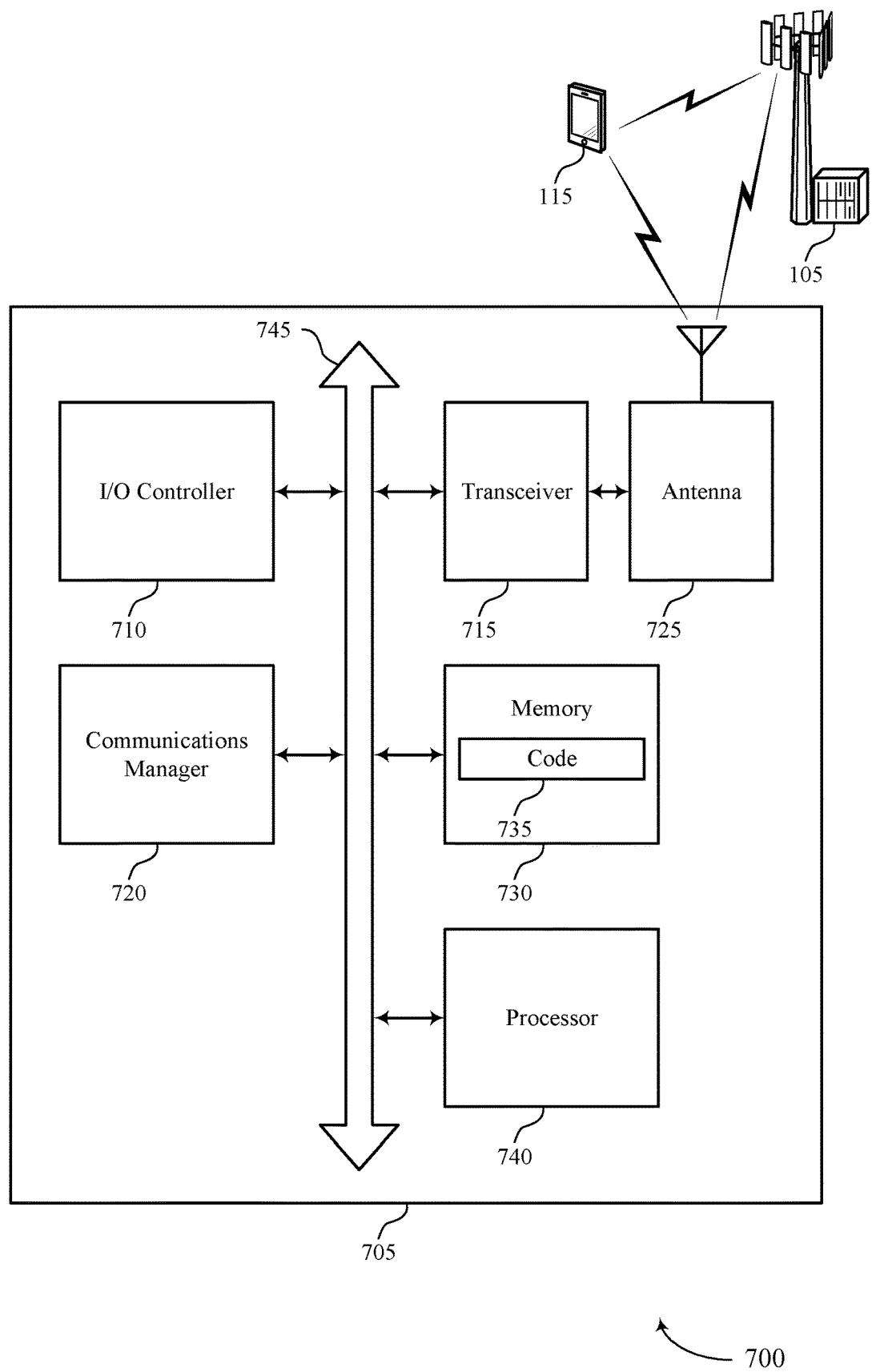
FIG. 7 shows a diagram of a system including a device that supports discovery of reconfigurable surfaces in accordance with aspects of the present disclosure.

FIG. 7 shows a diagram of a system 700 including a device 705 that supports discovery of reconfigurable surfaces in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting discovery of reconfigurable surfaces). For example, the device 705 or a component of the device 705 may include a processor 740 and memory 730 coupled to the processor 740, the processor 740 and memory 730 configured to perform various functions described herein.

The communications manager 720 may support wireless communication at a device in accordance with examples as disclosed herein. For example, the communications manager 720 may be configured as or otherwise support a means for detecting a signal during an operation associated with discovering a presence of reconfigurable surfaces. The communications manager 720 may be configured as or otherwise support a means for combining the signal with a modulation sequence to obtain a combined signal, the modulation sequence being associated with a reconfigurable surface. The communications manager 720 may be configured as or otherwise support a means for measuring a metric of the combined signal, where a presence of the reconfigurable surface in a geographic region is determined based on the metric.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of discovery of reconfigurable surfaces as described herein, or the processor 740 and the memory 730 may be otherwise configured to perform or support such operations.

Figure 8:
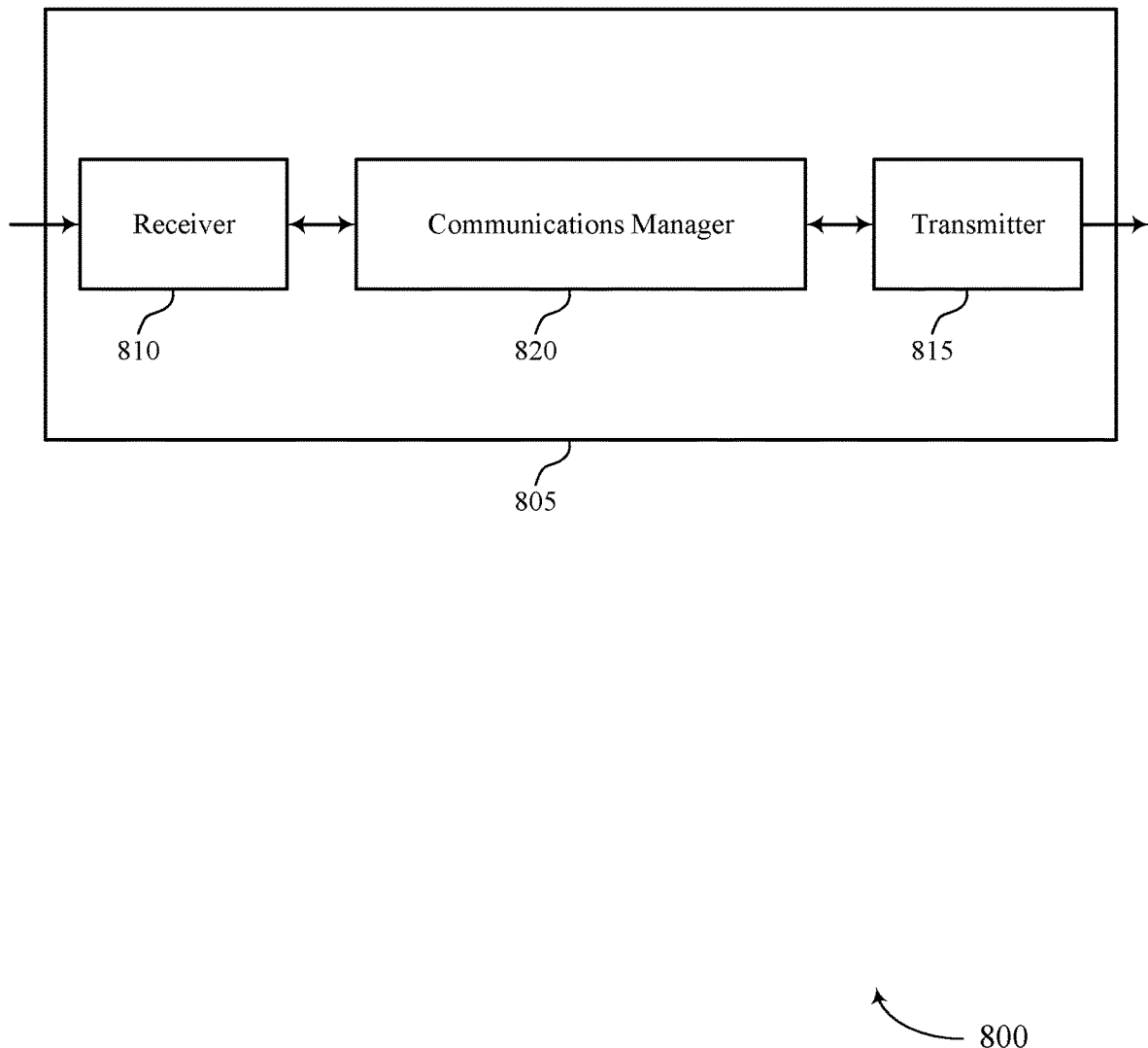
FIGS. 8 and 9 show block diagrams of devices that support discovery of reconfigurable surfaces in accordance with aspects of the present disclosure.

FIG. 8 shows a block diagram 800 of a device 805 that supports discovery of reconfigurable surfaces in accordance with aspects of the present disclosure. The device 805 may be an example of aspects of a reconfigurable surface as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to discovery of reconfigurable surfaces). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to discovery of reconfigurable surfaces). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of discovery of reconfigurable surfaces as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a reconfigurable surface in accordance with examples as disclosed herein. For example, the communications manager 820 may be configured as or otherwise support a means for receiving, from a transmitting device, a signal during an operation associated with discovering a presence of the reconfigurable surface. The communications manager 820 may be configured as or otherwise support a means for applying a modulation sequence to the signal to obtain a modulated signal, the modulation sequence being associated with the reconfigurable surface. The communications manager 820 may be configured as or otherwise support a means for transmitting the modulated signal based on applying the modulation sequence.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for enabling a device to discover which reconfigurable surfaces are in a vicinity of the device.

Figure 9:
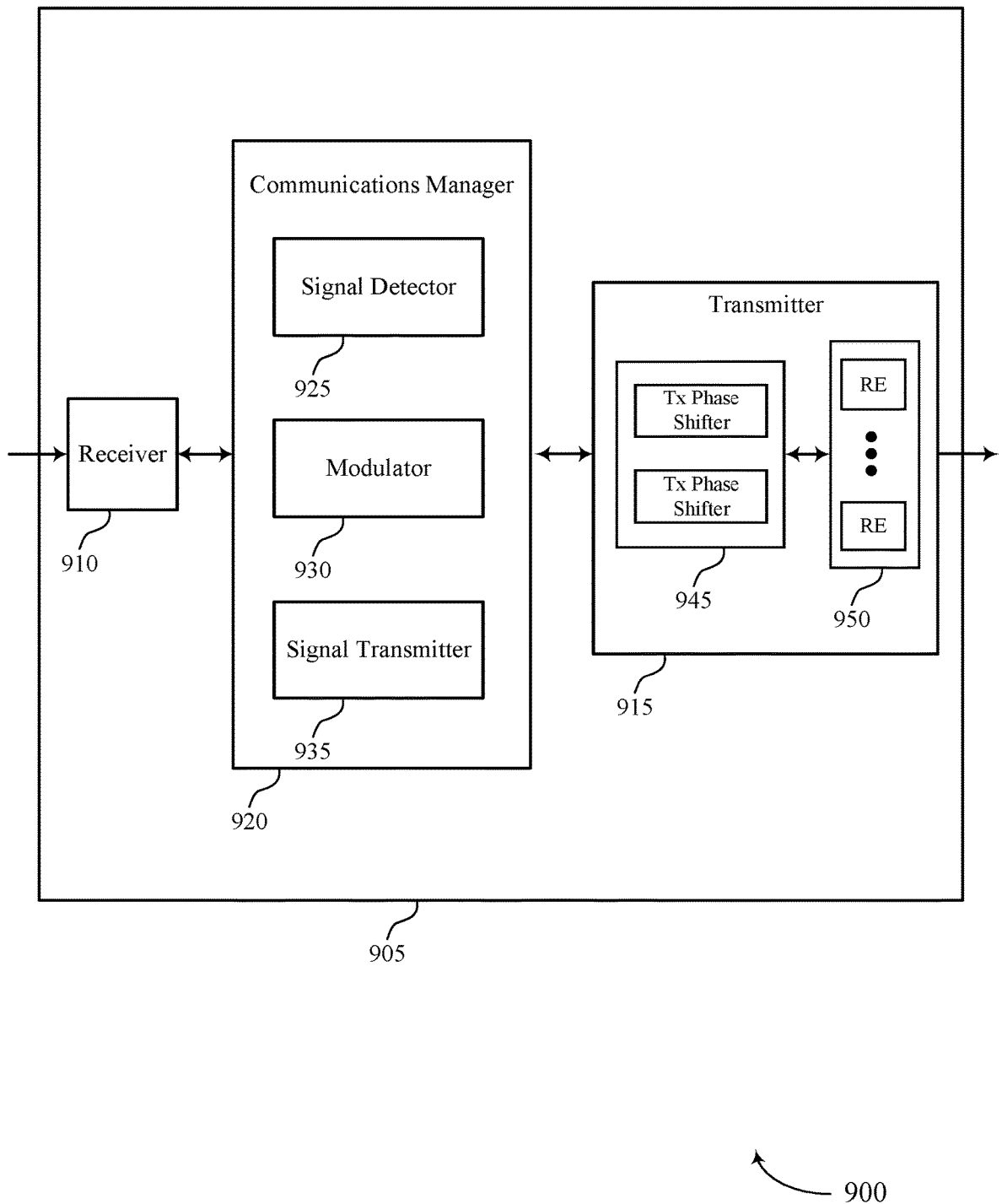

FIG. 9 shows a block diagram 900 of a device 905 that supports discovery of reconfigurable surfaces in accordance with aspects of the present disclosure. The device 905 may be an example of aspects of a device 805 or a reconfigurable surface 117 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to discovery of reconfigurable surfaces). Information may be passed on to other components of the device 905. The receiver 910 may utilize a single reflector or a set of multiple reflectors.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to discovery of reconfigurable surfaces). In some examples, the transmitter 915 may be co-located with a receiver 910 in a transceiver module. The transmitter 915 may include one or more phase shifters 945 and one or more reflective elements 950. The transmitter 915 may utilize a single reflector or a set of multiple reflectors.

A phase shifter 945 may provide a configurable phase shift or phase offset to a corresponding radio frequency signal to be transmitted on a respective reflective element 950. The settings of each of the phase shifters 945 may be independent, meaning that each can be set to provide a desired amount of phase shift or the same amount of phase shift or some other configuration. A modem or other processor may have at least one control line connected to each of the phase shifters 945 and which may be used to configure the phase shifters 945 to provide a desired amounts of phase shift or phase offset between reflective elements 950.

In at least one embodiment, changing or receiving a transmit or receive beam comprises adjusting relative phase shifts for signals on different reflective elements 950. The relative phase shifts may be achieved by the modem adjusting the phase shift of the one or more phase shifters 945. The set of phases for different phase shifters 945 (and corresponding reflective elements 950) may comprise the spatial receive parameters or spatial transmit parameters for a respective beam. To receive or transmit on a beam, the spatial parameters may need to be set before the beginning of the transmitting or receiving.

The device 905, or various components thereof, may be an example of means for performing various aspects of discovery of reconfigurable surfaces as described herein. For example, the communications manager 920 may include a signal detector 925, a modulator 930, a signal transmitter 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a reconfigurable surface in accordance with examples as disclosed herein. The signal detector 925 may be configured as or otherwise support a means for receiving, from a transmitting device, a signal during an operation associated with discovering a presence of the reconfigurable surface. The modulator 930 may be configured as or otherwise support a means for applying a modulation sequence to the signal to obtain a modulated signal, the modulation sequence being associated with the reconfigurable surface. The signal transmitter 935 may be configured as or otherwise support a means for transmitting the modulated signal based on applying the modulation sequence.

Figure 10:
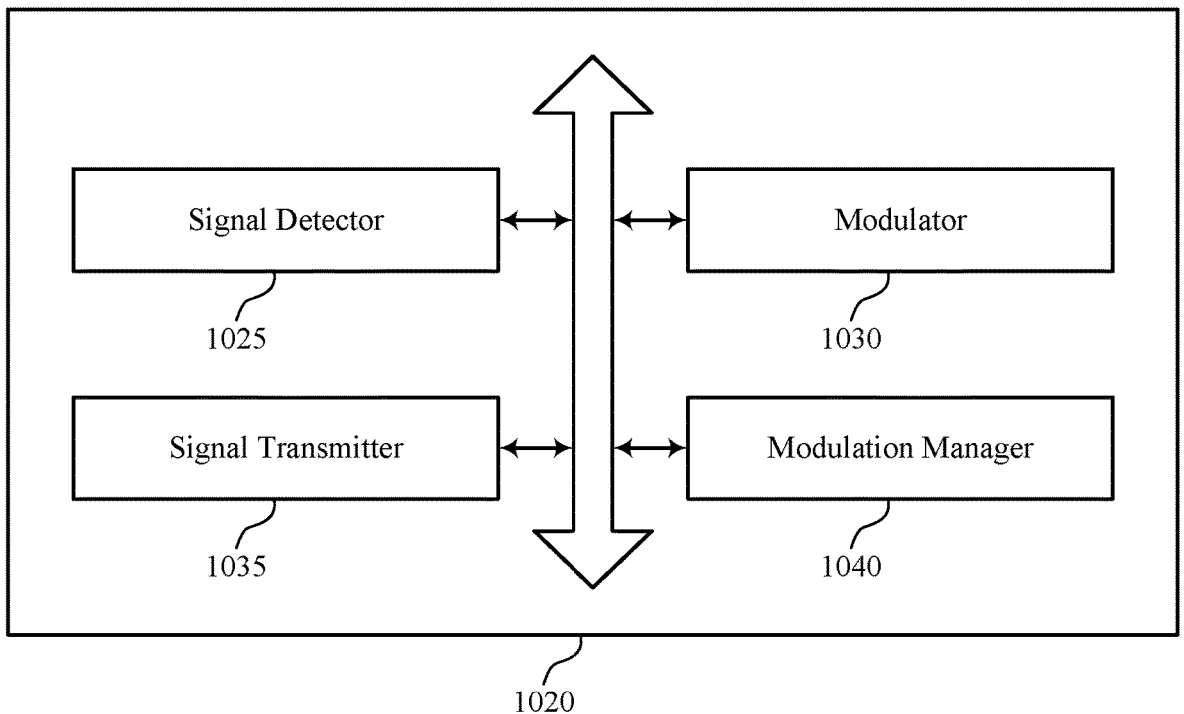
FIG. 10 shows a block diagram of a communications manager that supports discovery of reconfigurable surfaces in accordance with aspects of the present disclosure.

FIG. 10 shows a block diagram 1000 of a communications manager 1020 that supports discovery of reconfigurable surfaces in accordance with aspects of the present disclosure. The communications manager 1020 may be an example of aspects of a communications manager 820, a communications manager 920, or both, as described herein. The communications manager 1020, or various components thereof, may be an example of means for performing various aspects of discovery of reconfigurable surfaces as described herein. For example, the communications manager 1020 may include a signal detector 1025, a modulator 1030, a signal transmitter 1035, a modulation manager 1040, or any combination thereof. Each of these components may communicate, directly or indirectly, with one another (e.g., via one or more buses).

The communications manager 1020 may support wireless communication at a reconfigurable surface in accordance with examples as disclosed herein. The signal detector 1025 may be configured as or otherwise support a means for receiving, from a transmitting device, a signal during an operation associated with discovering a presence of the reconfigurable surface. The modulator 1030 may be configured as or otherwise support a means for applying a modulation sequence to the signal to obtain a modulated signal, the modulation sequence being associated with the reconfigurable surface. The signal transmitter 1035 may be configured as or otherwise support a means for transmitting the modulated signal based on applying the modulation sequence.

In some examples, the signal detector 1025 may be configured as or otherwise support a means for detecting boundaries of portions of the signal, where applying the modulation sequence includes applying a first modulation to a first portion of the signal and a second modulation to a second portion of the signal based on detecting the boundaries of the portions of the signal.

In some examples, to support applying the modulation sequence to the signal, the modulator 1030 may be configured as or otherwise support a means for applying a phase modulation, an amplitude modulation, a polarization, or a spatial modulation to the signal.

In some examples, the modulation manager 1040 may be configured as or otherwise support a means for receiving a message assigning the modulation sequence to the reconfigurable surface, the modulation sequence being one of a set of multiple modulation sequences and being unique to the reconfigurable surface. In some examples, the set of multiple modulation sequences are orthogonal to one another.

In some examples, the modulation manager 1040 may be configured as or otherwise support a means for receiving a message assigning a set of multiple modulation sequences to the reconfigurable surface, the set of multiple modulation sequences being unique to the reconfigurable surface and each modulation sequence of the set of multiple modulation sequences associated with a different angle of reflection for the reconfigurable surface.

Figure 11:
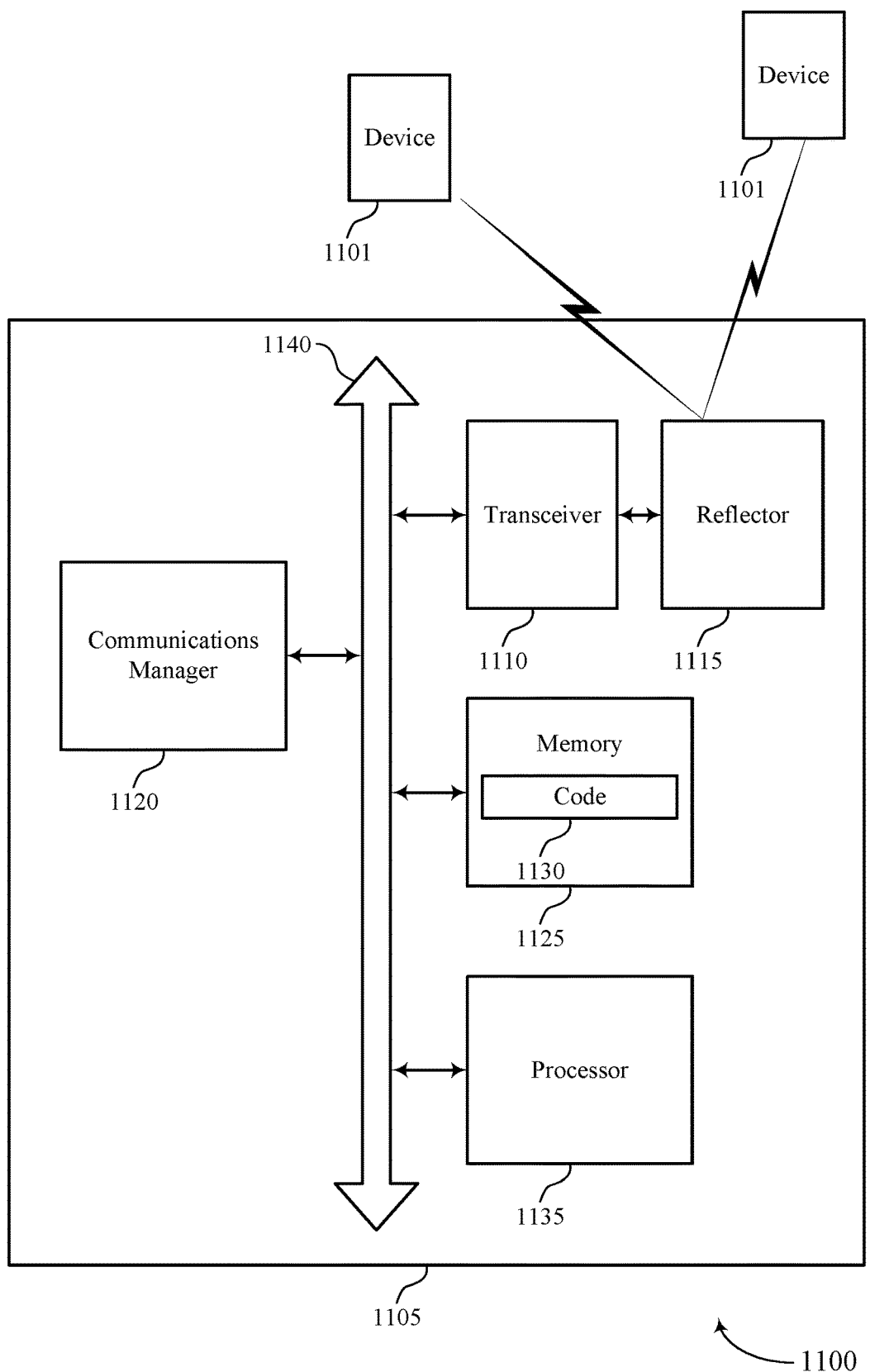
FIG. 11 shows a diagram of a system including a device that supports discovery of reconfigurable surfaces in accordance with aspects of the present disclosure.

FIG. 11 shows a diagram of a system 1100 including a device 1105 that supports discovery of reconfigurable surfaces in accordance with aspects of the present disclosure. The device 1105 may be an example of or include the components of a device 805, a device 905, or a reconfigurable surface as described herein. Device 1105 may be configured to direct reflections of transmissions from one device 1101 (e.g., a base station or UE) in the direction of another device 1105 (e.g., a base station or UE).

The device 1105 may include components for bi-directional voice and data communications including components for transmitting and receiving communications, such as a communications manager 1120, a transceiver 1110, a reflector 1115, a memory 1125, code 1130, and a processor 1135. These components may be in electronic communication or otherwise coupled (e.g., operatively, communicatively, functionally, electronically, electrically) via one or more buses (e.g., a bus 1140).

In some cases, the device 1105 may include a reflector 1115. The reflector 1115 may include one or more reflective elements and may be referred to as a reflective surface, reconfigurable surface, or reconfigurable intelligent surface.

In some examples, the reflector 1115 includes one or more reflective elements (which may include transmission lines, reflectors, antennas, etc.). The transceiver 1110 may be used to relay communications between devices, via the reflector 1115. In some examples, the transceiver 1110 may be coupled with one or more antennas used to received signals and may relay the received signal by transmitting modified versions of the received signals through the reflector 1115. In some examples, the transceiver 1110 applies reflection coefficients to the received signals before transmitting the received signals from the reflector 1115. The transceiver 1110 may be an example of a transmitter 815, a transmitter 915, a receiver 810, a receiver 910, or any combination thereof or component thereof, as described herein.

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting discovery of reconfigurable surfaces). For example, the device 1105 or a component of the device 1105 may include a processor 1135 and memory 1125 coupled to the processor 1135, the processor 1135 and memory 1125 configured to perform various functions described herein.

The communications manager 1120 may support wireless communication at a reconfigurable surface in accordance with examples as disclosed herein. For example, the communications manager 1120 may be configured as or otherwise support a means for receiving, from a transmitting device, a signal during an operation associated with discovering a presence of the reconfigurable surface. The communications manager 1120 may be configured as or otherwise support a means for applying a modulation sequence to the signal to obtain a modulated signal, the modulation sequence being associated with the reconfigurable surface. The communications manager 1120 may be configured as or otherwise support a means for transmitting the modulated signal based on applying the modulation sequence.

In some examples, the communications manager 1120 may be configured to perform various operations (e.g., receiving, monitoring, transmitting) using or otherwise in cooperation with the transceiver 1110, the reflector 1115, or any combination thereof. Although the communications manager 1120 is illustrated as a separate component, in some examples, one or more functions described with reference to the communications manager 1120 may be supported by or performed by the processor 1135, the memory 1125, the code 1130, or any combination thereof. For example, the code 1130 may include instructions executable by the processor 1135 to cause the device 1105 to perform various aspects of discovery of reconfigurable surfaces as described herein, or the processor 1135 and the memory 1125 may be otherwise configured to perform or support such operations.

Figure 12:
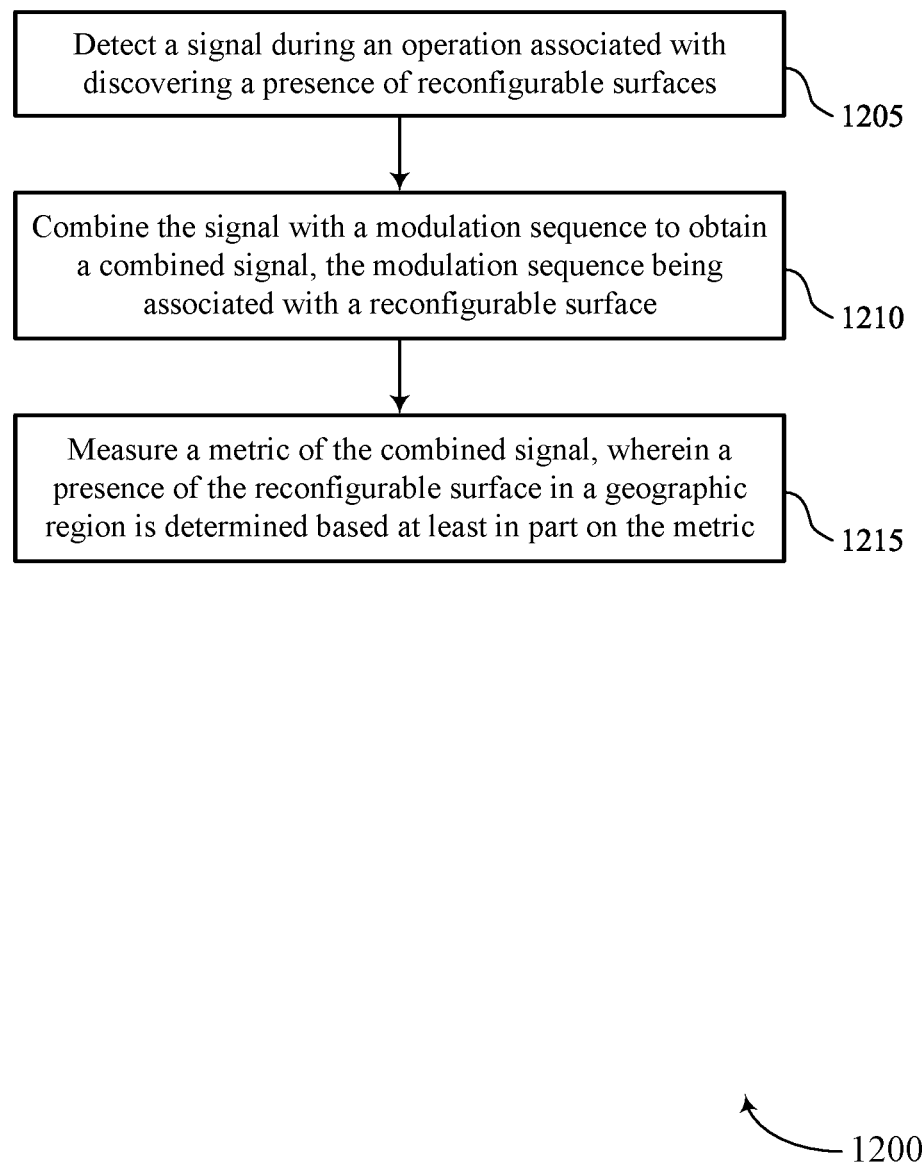
FIGS. 12 through 16 show flowcharts illustrating methods that support discovery of reconfigurable surfaces in accordance with aspects of the present disclosure.

FIG. 12 shows a flowchart illustrating a method 1200 that supports discovery of reconfigurable surfaces in accordance with aspects of the present disclosure. The operations of the method 1200 may be implemented by a UE (e.g., first UE 215-1 of FIG. 2A or 2B) or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include detecting a signal during an operation associated with discovering a presence of reconfigurable surfaces. The operations of 1205 may be performed in accordance with examples as disclosed herein. In some examples, aspects of the operations of 1205 may be performed by a signal detector 625 as described with reference to FIG. 6.

At 1210, the method may include combining the signal with a modulation sequence to obtain a combined signal, the modulation sequence being associated with a reconfigurable surface. The operations of 1210 may be performed in accordance with examples as disclosed herein. In some examples, aspects of the operations of 1210 may be performed by a signal combiner 630 as described with reference to FIG. 6.

At 1215, the method may include measuring a metric of the combined signal, where a presence of the reconfigurable surface in a geographic region is determined based on the metric. The operations of 1215 may be performed in accordance with examples as disclosed herein. In some examples, aspects of the operations of 1215 may be performed by a signal analyzer 635 as described with reference to FIG. 6.

Figure 13:
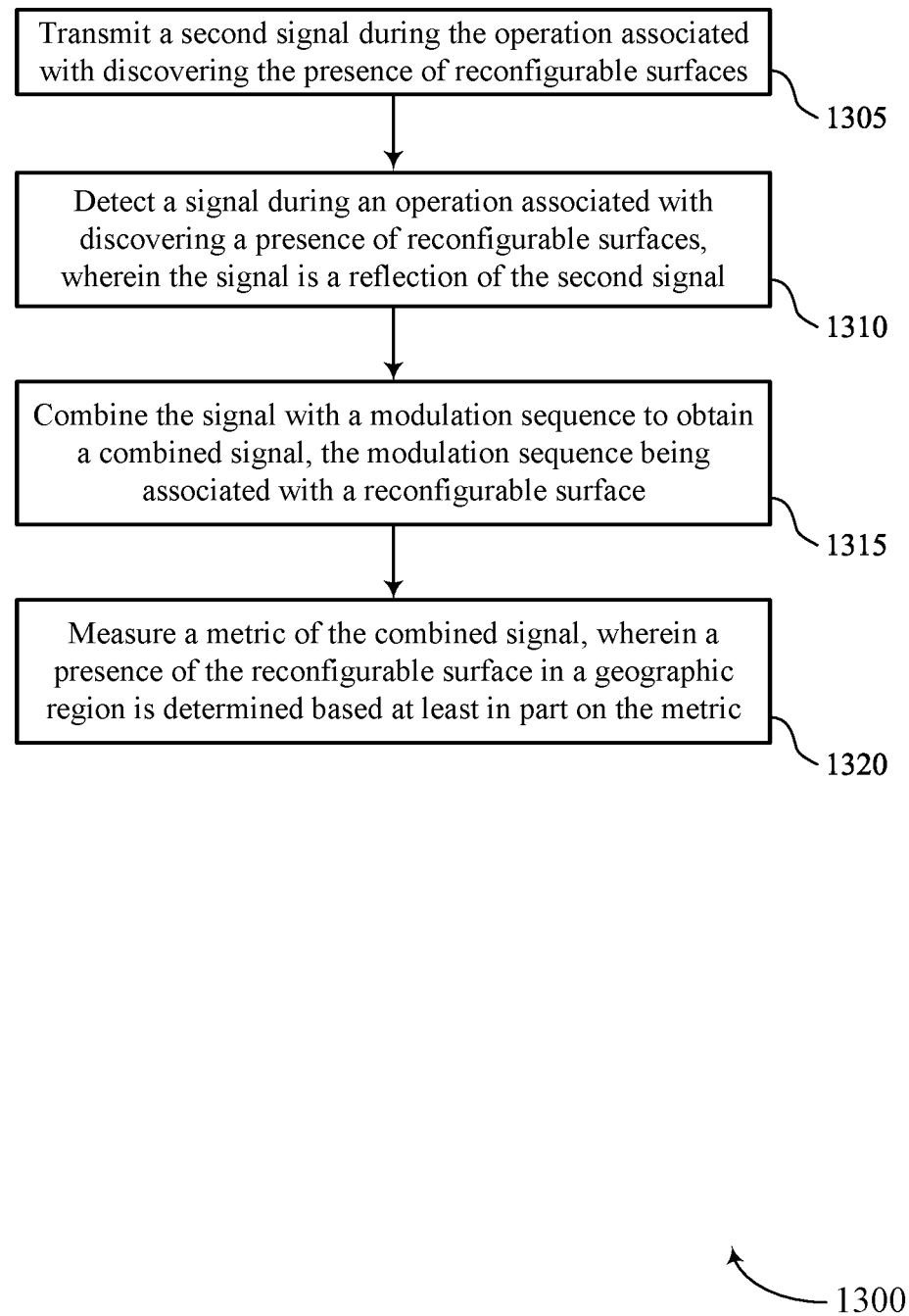

FIG. 13 shows a flowchart illustrating a method 1300 that supports discovery of reconfigurable surfaces in accordance with aspects of the present disclosure. The operations of the method 1300 may be implemented by a UE (e.g., first UE 215-1 of FIG. 2A or 2B) or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting a second signal during the operation associated with discovering the presence of reconfigurable surfaces. The operations of 1305 may be performed in accordance with examples as disclosed herein. In some examples, aspects of the operations of 1305 may be performed by a sensing signal transmitter 640 as described with reference to FIG. 6.

At 1310, the method may include detecting a signal during an operation associated with discovering a presence of reconfigurable surfaces, where the signal is a reflection of the second signal. The operations of 1310 may be performed in accordance with examples as disclosed herein. In some examples, aspects of the operations of 1310 may be performed by a signal detector 625 as described with reference to FIG. 6.

At 1315, the method may include combining the signal with a modulation sequence to obtain a combined signal, the modulation sequence being associated with a reconfigurable surface. The operations of 1315 may be performed in accordance with examples as disclosed herein. In some examples, aspects of the operations of 1315 may be performed by a signal combiner 630 as described with reference to FIG. 6.

At 1320, the method may include measuring a metric of the combined signal, where a presence of the reconfigurable surface in a geographic region is determined based on the metric. The operations of 1320 may be performed in accordance with examples as disclosed herein. In some examples, aspects of the operations of 1320 may be performed by a signal analyzer 635 as described with reference to FIG. 6.

Figure 14:
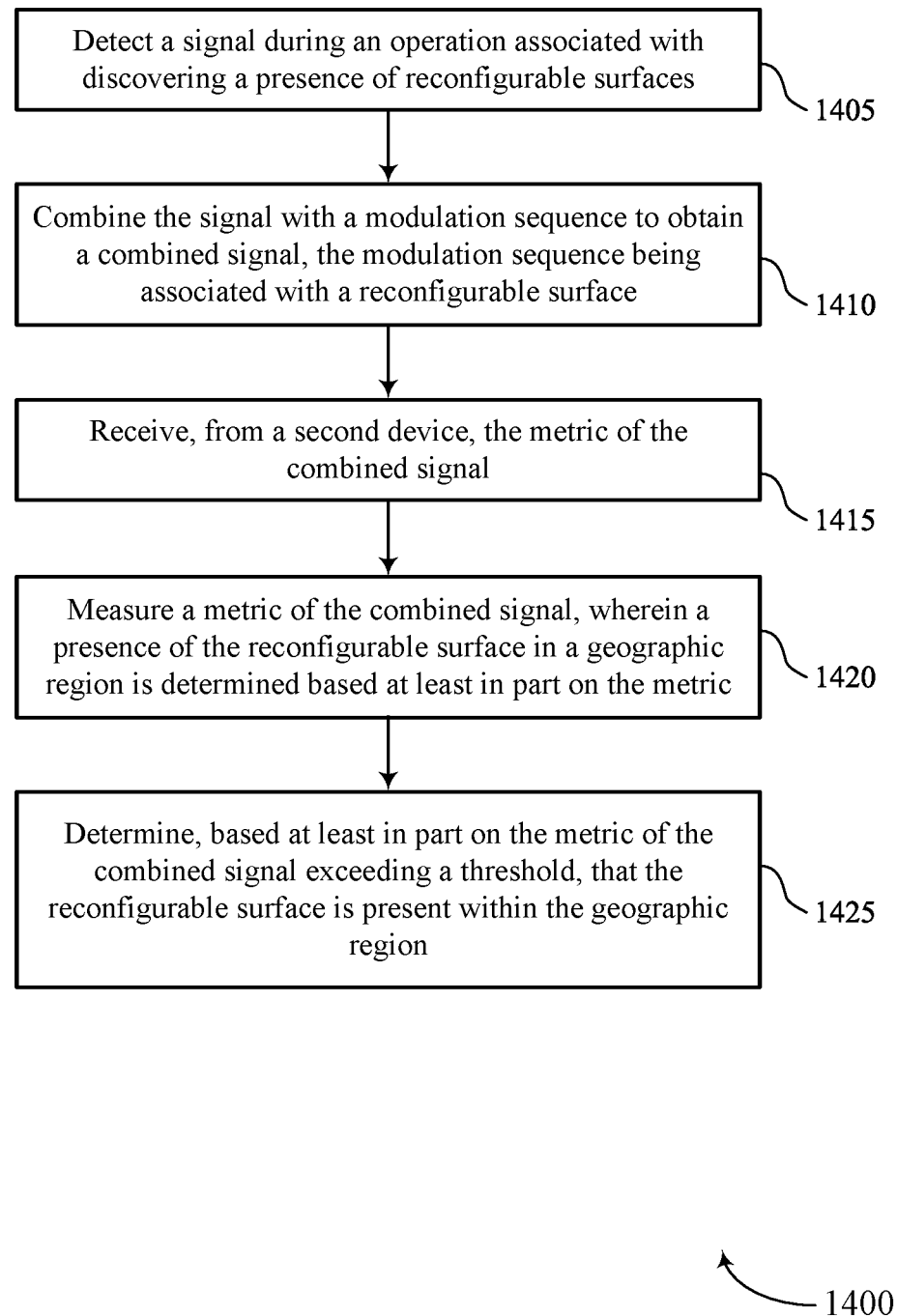

FIG. 14 shows a flowchart illustrating a method 1400 that supports discovery of reconfigurable surfaces in accordance with aspects of the present disclosure. The operations of the method 1400 may be implemented by a UE (e.g., first UE 215-1 of FIG. 2A or 2B) or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include detecting a signal during an operation associated with discovering a presence of reconfigurable surfaces. The operations of 1405 may be performed in accordance with examples as disclosed herein. In some examples, aspects of the operations of 1405 may be performed by a signal detector 625 as described with reference to FIG. 6.

At 1410, the method may include combining the signal with a modulation sequence to obtain a combined signal, the modulation sequence being associated with a reconfigurable surface. The operations of 1410 may be performed in accordance with examples as disclosed herein. In some examples, aspects of the operations of 1410 may be performed by a signal combiner 630 as described with reference to FIG. 6.

At 1415, the method may include receiving, from a second device, the metric of the combined signal. The operations of 1415 may be performed in accordance with examples as disclosed herein. In some examples, aspects of the operations of 1415 may be performed by a report processing component 650 as described with reference to FIG. 6.

At 1420, the method may include measuring a metric of the combined signal, where a presence of the reconfigurable surface in a geographic region is determined based on the metric. The operations of 1420 may be performed in accordance with examples as disclosed herein. In some examples, aspects of the operations of 1420 may be performed by a signal analyzer 635 as described with reference to FIG. 6.

At 1425, the method may include determining, based on the metric of the combined signal exceeding a threshold, that the reconfigurable surface is present within the geographic region. The operations of 1425 may be performed in accordance with examples as disclosed herein. In some examples, aspects of the operations of 1425 may be performed by a discovery component 645 as described with reference to FIG. 6.

Figure 15:
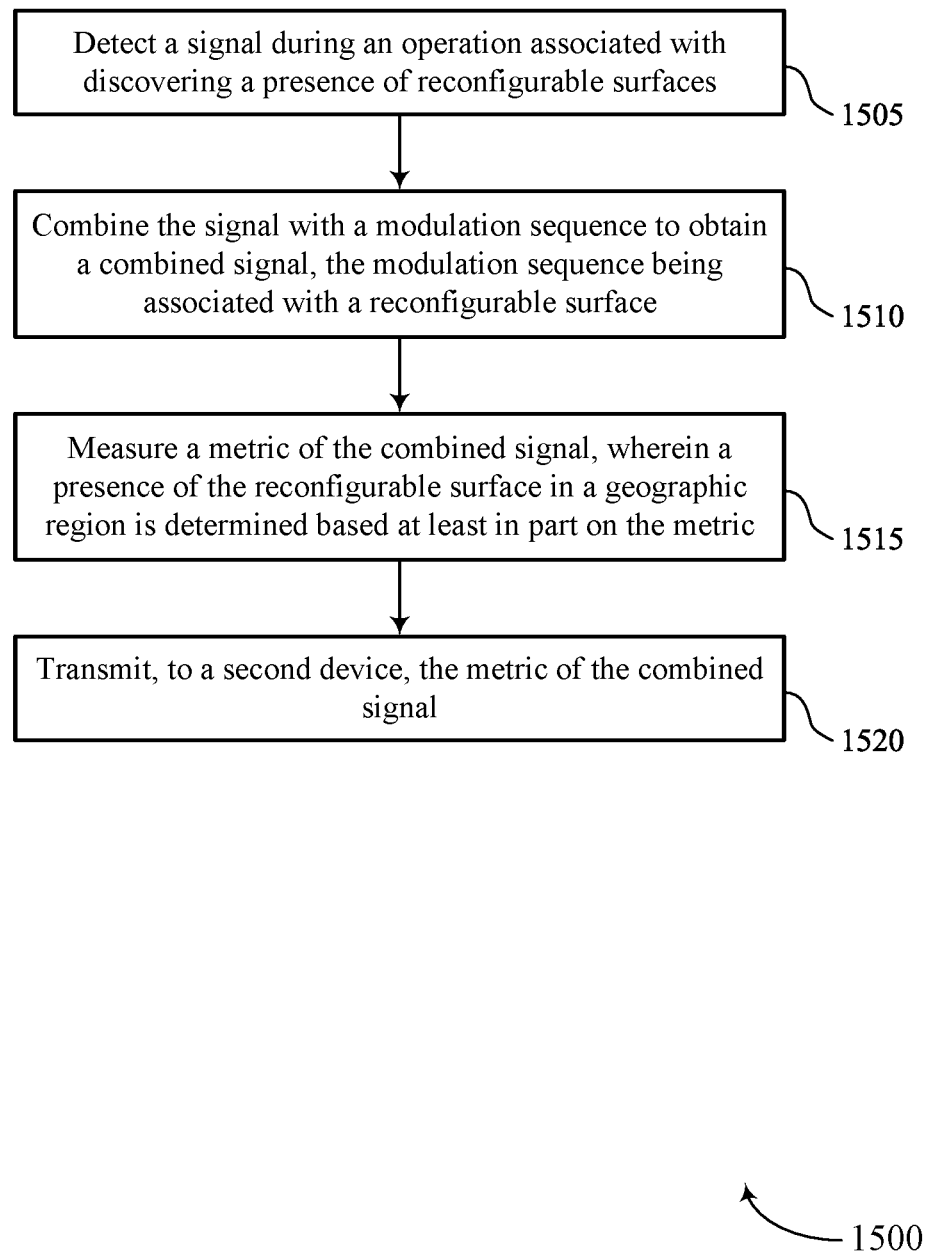

FIG. 15 shows a flowchart illustrating a method 1500 that supports discovery of reconfigurable surfaces in accordance with aspects of the present disclosure. The operations of the method 1500 may be implemented by a UE (e.g., second UE 215-2 of FIG. 2A or 2B) or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1505, the method may include detecting a signal during an operation associated with discovering a presence of reconfigurable surfaces. The operations of 1505 may be performed in accordance with examples as disclosed herein. In some examples, aspects of the operations of 1505 may be performed by a signal detector 625 as described with reference to FIG. 6.

At 1510, the method may include combining the signal with a modulation sequence to obtain a combined signal, the modulation sequence being associated with a reconfigurable surface. The operations of 1510 may be performed in accordance with examples as disclosed herein. In some examples, aspects of the operations of 1510 may be performed by a signal combiner 630 as described with reference to FIG. 6.

At 1515, the method may include measuring a metric of the combined signal, where a presence of the reconfigurable surface in a geographic region is determined based on the metric. The operations of 1515 may be performed in accordance with examples as disclosed herein. In some examples, aspects of the operations of 1515 may be performed by a signal analyzer 635 as described with reference to FIG. 6.

At 1520, the method may include transmitting, to a second device, the metric of the combined signal. The operations of 1520 may be performed in accordance with examples as disclosed herein. In some examples, aspects of the operations of 1520 may be performed by a reporting component 655 as described with reference to FIG. 6.

Figure 16:
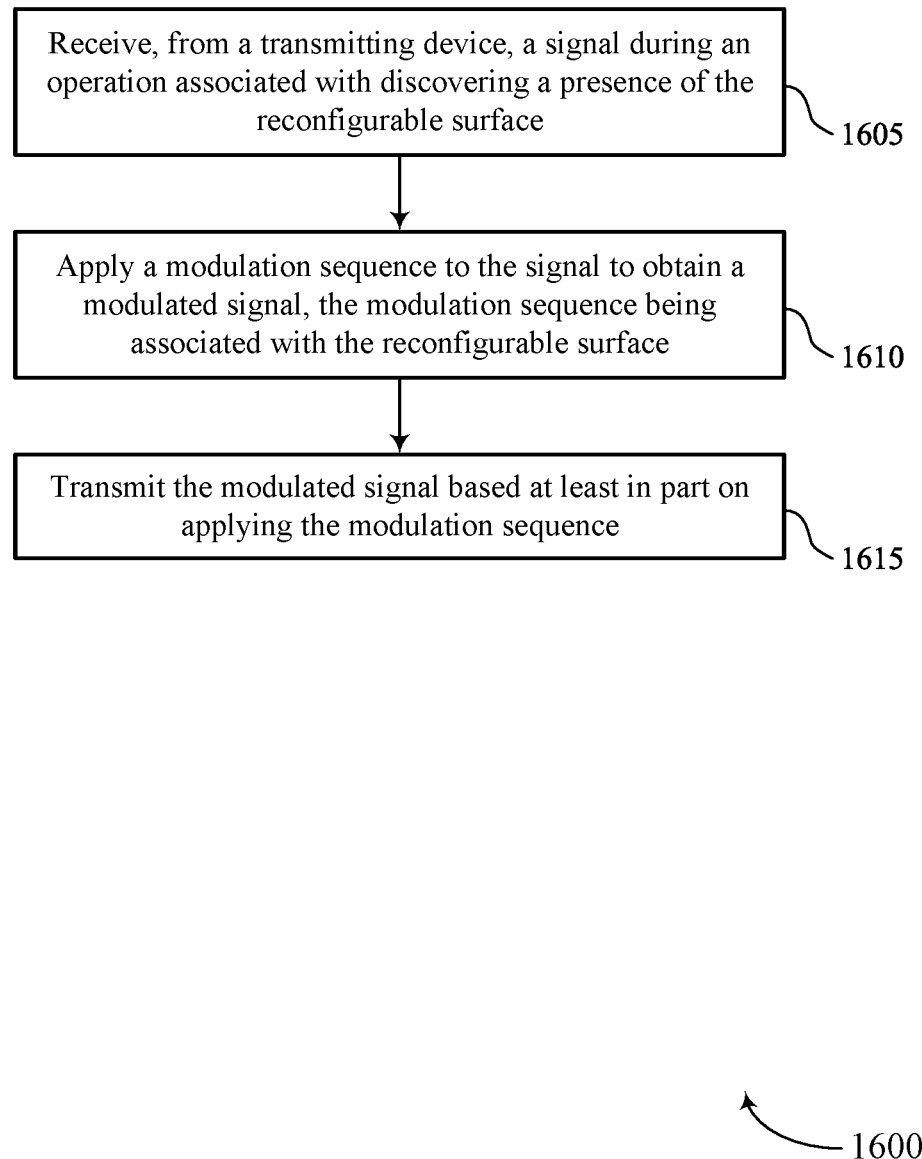

FIG. 16 shows a flowchart illustrating a method 1600 that supports discovery of reconfigurable surfaces in accordance with aspects of the present disclosure. The operations of the method 1600 may be implemented by a reconfigurable surface or its components as described herein. For example, the operations of the method 1600 may be performed by a reconfigurable surface as described with reference to FIGS. 1 through 3 and 8 through 11. In some examples, a reconfigurable surface may execute a set of instructions to control the functional elements of the reconfigurable surface to perform the described functions. Additionally, or alternatively, the reconfigurable surface may perform aspects of the described functions using special-purpose hardware.

At 1605, the method may include receiving, from a transmitting device, a signal during an operation associated with discovering a presence of the reconfigurable surface. The operations of 1605 may be performed in accordance with examples as disclosed herein. In some examples, aspects of the operations of 1605 may be performed by a signal detector 1025 as described with reference to FIG. 10.

At 1610, the method may include applying a modulation sequence to the signal to obtain a modulated signal, the modulation sequence being associated with the reconfigurable surface. The operations of 1610 may be performed in accordance with examples as disclosed herein. In some examples, aspects of the operations of 1610 may be performed by a modulator 1030 as described with reference to FIG. 10.

At 1615, the method may include transmitting the modulated signal based on applying the modulation sequence. The operations of 1615 may be performed in accordance with examples as disclosed herein. In some examples, aspects of the operations of 1615 may be performed by a signal transmitter 1035 as described with reference to FIG. 10.

The following provides an overview of aspects of the present disclosure:

Aspect 1: A method for wireless communication at a device, comprising: detecting a signal during an operation associated with discovering a presence of reconfigurable surfaces; combining the signal with a modulation sequence to obtain a combined signal, the modulation sequence being associated with a reconfigurable surface; and measuring a metric of the combined signal, wherein a presence of the reconfigurable surface in a geographic region is determined based at least in part on the metric.

Aspect 2: The method of aspect 1, further comprising: transmitting a second signal during the operation associated with discovering the presence of reconfigurable surfaces, wherein the signal is a reflection of the second signal.

Aspect 3: The method of any of aspects 1 through 2, further comprising: determining, based at least in part on the metric of the combined signal exceeding a threshold, that the reconfigurable surface is present within the geographic region.

Aspect 4: The method of any of aspects 1 through 3, further comprising: receiving, from a second device, the metric of the combined signal; and determining, based at least in part on the metric of the combined signal exceeding a threshold, that the reconfigurable surface is present within the geographic region.

Aspect 5: The method of any of aspects 1 through 4, further comprising: transmitting, to a second device, an indication of a duration for performing the operation associated with discovering the presence of reconfigurable surfaces.

Aspect 6: The method of aspects 1, further comprising: transmitting, to a second device, the metric of the combined signal.

Aspect 7: The method of any of aspects 1 or 6, further comprising: detecting, during the operation associated with discovering the presence of reconfigurable surfaces, a second signal that is detected via a direct path with a second device and interferes with the signal detected during the operation, wherein combining the signal with the modulation sequence reduces an interference from the second signal on the signal.

Aspect 8: The method of any of aspects 1 through 7, further comprising: combining the signal with a second modulation sequence to obtain a second combined signal, the second modulation sequence being associated with a second reconfigurable surface; and measuring a metric of the second combined signal, wherein a presence of the second reconfigurable surface in the geographic region is determined based at least in part on the metric of the second combined signal.

Aspect 9: The method of any of aspects 1 through 8, further comprising: receiving, in a broadcast message, a mapping between a plurality of modulation sequences and a plurality of reconfigurable surfaces, the plurality of modulation sequences comprising the modulation sequence and the plurality of reconfigurable surfaces comprising the reconfigurable surface.

Aspect 10: The method of aspect 9, further comprising: determining a correspondence between the signal and the reconfigurable surface based at least in part on the mapping between the plurality of modulation sequences and the plurality of reconfigurable surfaces.

Aspect 11: The method of any of aspects 9 through 10, further comprising: determining a correspondence between the signal, the reconfigurable surface, and an angle of reflection configured at the reconfigurable surface based at least in part on the mapping between the plurality of modulation sequences and the plurality of reconfigurable surfaces.

Aspect 12: The method of any of aspects 1 through 11, wherein the signal comprises a plurality of portions, and a quantity of portions of the plurality of portions is based at least in part on a quantity of reconfigurable surfaces in the geographic region.

Aspect 13: The method of aspect 12, wherein the plurality of portions comprises a plurality of repetitions of a symbol or a plurality of symbols used to represent data for a second device.

Aspect 14: The method of aspect 12, wherein the plurality of portions comprises a plurality of symbols, a plurality of slots, or a plurality of resources.

Aspect 15: The method of aspect 12, wherein the plurality of portions comprises a plurality of symbols, the plurality of symbols comprising a reference signal associated with discovering reconfigurable surfaces, a phase reference signal, or a channel state information reference signal.

Aspect 16: A method for wireless communication at a reconfigurable surface, comprising: receiving, from a transmitting device, a signal during an operation associated with discovering a presence of the reconfigurable surface; applying a modulation sequence to the signal to obtain a modulated signal, the modulation sequence being associated with the reconfigurable surface; and transmitting the modulated signal based at least in part on applying the modulation sequence.

Aspect 17: The method of aspect 16, further comprising: detecting boundaries of portions of the signal, wherein applying the modulation sequence comprises applying a first modulation to a first portion of the signal and a second modulation to a second portion of the signal based at least in part on detecting the boundaries of the portions of the signal.

Aspect 18: The method of any of aspects 16 through 17, wherein applying the modulation sequence to the signal comprises: applying a phase modulation, an amplitude modulation, a polarization, or a spatial modulation to the signal.

Aspect 19: The method of any of aspects 16 through 18, further comprising: receiving a message assigning the modulation sequence to the reconfigurable surface, the modulation sequence being one of a plurality of modulation sequences and being unique to the reconfigurable surface.

Aspect 20: The method of aspect 19, wherein the plurality of modulation sequences are orthogonal to one another.

Aspect 21: The method of any of aspects 16 through 20, further comprising: receiving a message assigning a plurality of modulation sequences to the reconfigurable surface, the plurality of modulation sequences being unique to the reconfigurable surface and each modulation sequence of the plurality of modulation sequences associated with a different angle of reflection for the reconfigurable surface.

Aspect 22: An apparatus for wireless communication at a device, comprising a processor; memory coupled with the processor; and instructions stored in the memory and executable by the processor to cause the apparatus to perform a method of any of aspects 1 through 15.

Aspect 23: An apparatus for wireless communication at a device, comprising at least one means for performing a method of any of aspects 1 through 15.

Aspect 24: A non-transitory computer-readable medium storing code for wireless communication at a device, the code comprising instructions executable by a processor to perform a method of any of aspects 1 through 15.

Aspect 25: An apparatus for wireless communication at a reconfigurable surface, comprising a processor; memory coupled with the processor; and instructions stored in the memory and executable by the processor to cause the apparatus to perform a method of any of aspects 16 through 21.

Aspect 26: An apparatus for wireless communication at a reconfigurable surface, comprising at least one means for performing a method of any of aspects 16 through 21.

Aspect 27: A non-transitory computer-readable medium storing code for wireless communication at a reconfigurable surface, the code comprising instructions executable by a processor to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
   detecting a signal during an operation associated with discovering a presence of reconfigurable surfaces;
   combining the signal with a modulation sequence to obtain a combined signal, the modulation sequence being associated with a reconfigurable surface; and
   measuring a metric of the combined signal, wherein a presence of the reconfigurable surface in a geographic region is determined based at least in part on the metric.

2. The method of claim 1, further comprising:
   transmitting a second signal during the operation associated with discovering the presence of reconfigurable surfaces, wherein the signal is a reflection of the second signal.

3. The method of claim 1, further comprising:
   determining, based at least in part on the metric of the combined signal exceeding a threshold, that the reconfigurable surface is present within the geographic region.

4. The method of claim 1, further comprising:
   receiving, from a second device, the metric of the combined signal; and
   determining, based at least in part on the metric of the combined signal exceeding a threshold, that the reconfigurable surface is present within the geographic region.

5. The method of claim 1, further comprising:
   transmitting, to a second device, an indication of a duration for performing the operation associated with discovering the presence of reconfigurable surfaces.

6. The method of claim 1, further comprising:
   transmitting, to a second device, the metric of the combined signal.

7. The method of claim 1, further comprising:
   detecting, during the operation associated with discovering the presence of reconfigurable surfaces, a second signal that is detected via a direct path with a second device and interferes with the signal detected during the operation, wherein combining the signal with the modulation sequence reduces an interference from the second signal on the signal.

8. The method of claim 1, further comprising:
   combining the signal with a second modulation sequence to obtain a second combined signal, the second modulation sequence being associated with a second reconfigurable surface; and
   measuring a metric of the second combined signal, wherein a presence of the second reconfigurable surface in the geographic region is determined based at least in part on the metric of the second combined signal.

9. The method of claim 1, further comprising:
   receiving, in a broadcast message, a mapping between a plurality of modulation sequences and a plurality of reconfigurable surfaces, the plurality of modulation sequences comprising the modulation sequence and the plurality of reconfigurable surfaces comprising the reconfigurable surface.

10. The method of claim 9, further comprising:
    determining a correspondence between the signal and the reconfigurable surface based at least in part on the mapping between the plurality of modulation sequences and the plurality of reconfigurable surfaces.

11. The method of claim 9, further comprising:
    determining a correspondence between the signal, the reconfigurable surface, and an angle of reflection configured at the reconfigurable surface based at least in part on the mapping between the plurality of modulation sequences and the plurality of reconfigurable surfaces.

12. The method of claim 1, wherein the signal comprises a plurality of portions, and wherein a quantity of portions of the plurality of portions is based at least in part on a quantity of reconfigurable surfaces in the geographic region.

13. The method of claim 12, wherein the plurality of portions comprises a plurality of repetitions of a symbol or a plurality of symbols used to represent data for a second device.

14. The method of claim 12, wherein the plurality of portions comprises a plurality of symbols, a plurality of slots, or a plurality of resources.

15. The method of claim 12, wherein the plurality of portions comprises a plurality of symbols, the plurality of symbols comprising a reference signal associated with discovering reconfigurable surfaces, a phase reference signal, or a channel state information reference signal.

16. An apparatus for wireless communication at a device, comprising:
    a processor;
    memory coupled with the processor; and
    instructions stored in the memory and executable by the processor to cause the apparatus to:
       detect a signal during an operation associated with discovering a presence of reconfigurable surfaces;
       combine the signal with a modulation sequence to obtain a combined signal, the modulation sequence being associated with a reconfigurable surface; and
       measure a metric of the combined signal, wherein a presence of the reconfigurable surface in a geographic region is determined based at least in part on the metric.

17. The apparatus of claim 16, wherein the instructions are further executable by the processor to cause the apparatus to:

transmit a second signal during the operation associated with discovering the presence of reconfigurable surfaces, wherein the signal is a reflection of the second signal.

18. The apparatus of claim 16, wherein the instructions are further executable by the processor to cause the apparatus to:
determine, based at least in part on the metric of the combined signal exceeding a threshold, that the reconfigurable surface is present within the geographic region.

19. The apparatus of claim 16, wherein the instructions are further executable by the processor to cause the apparatus to:
receive, from a second device, the metric of the combined signal; and
determine, based at least in part on the metric of the combined signal exceeding a threshold, that the reconfigurable surface is present within the geographic region.

20. The apparatus of claim 16, wherein the instructions are further executable by the processor to cause the apparatus to:
transmit, to a second device, an indication of a duration for performing the operation associated with discovering the presence of reconfigurable surfaces.

21. The apparatus of claim 16, wherein the instructions are further executable by the processor to cause the apparatus to:
transmit, to a second device, the metric of the combined signal.

22. The apparatus of claim 16, wherein the instructions are further executable by the processor to cause the apparatus to:
detect, during the operation associated with discovering the presence of reconfigurable surfaces, a second signal that is detected via a direct path with a second device and interferes with the signal detected during the operation, wherein combining the signal with the modulation sequence reduces an interference from the second signal on the signal.

23. The apparatus of claim 16, wherein the instructions are further executable by the processor to cause the apparatus to:
combine the signal with a second modulation sequence to obtain a second combined signal, the second modulation sequence being associated with a second reconfigurable surface; and
measure a metric of the second combined signal, wherein a presence of the second reconfigurable surface in the geographic region is determined based at least in part on the metric of the second combined signal.

24. The apparatus of claim 16, wherein the instructions are further executable by the processor to cause the apparatus to:
receive, in a broadcast message, a mapping between a plurality of modulation sequences and a plurality of reconfigurable surfaces, the plurality of modulation sequences comprising the modulation sequence and the plurality of reconfigurable surfaces comprising the reconfigurable surface.

25. The apparatus of claim 24, wherein the instructions are further executable by the processor to cause the apparatus to:
determine a correspondence between the signal and the reconfigurable surface based at least in part on the mapping between the plurality of modulation sequences and the plurality of reconfigurable surfaces.

26. The apparatus of claim 24, wherein the instructions are further executable by the processor to cause the apparatus to:
determine a correspondence between the signal, the reconfigurable surface, and an angle of reflection configured at the reconfigurable surface based at least in part on the mapping between the plurality of modulation sequences and the plurality of reconfigurable surfaces.

27. The apparatus of claim 16, wherein the signal comprises a plurality of portions, and wherein a quantity of portions of the plurality of portions is based at least in part on a quantity of reconfigurable surfaces in the geographic region.

28. The apparatus of claim 27, wherein the plurality of portions comprises a plurality of repetitions of a symbol or a plurality of symbols used to represent data for a second device.

29. An apparatus for wireless communication at a device, comprising:
means for detecting a signal during an operation associated with discovering a presence of reconfigurable surfaces;
means for combining the signal with a modulation sequence to obtain a combined signal, the modulation sequence being associated with a reconfigurable surface; and
means for measuring a metric of the combined signal, wherein a presence of the reconfigurable surface in a geographic region is determined based at least in part on the metric.

30. A non-transitory computer-readable medium storing code for wireless communications, the code comprising instructions executable by one or more processors to:
detect a signal during an operation associated with discovering a presence of reconfigurable surfaces;
combine the signal with a modulation sequence to obtain a combined signal, the modulation sequence being associated with a reconfigurable surface; and
measure a metric of the combined signal, wherein a presence of the reconfigurable surface in a geographic region is determined based at least in part on the metric.

* * * * *